(12) United States Patent
Govers et al.

(10) Patent No.: US 9,875,648 B2
(45) Date of Patent: Jan. 23, 2018

(54) METHODS AND SYSTEMS FOR REDUCING FALSE ALARMS IN A ROBOTIC DEVICE BY SENSOR FUSION

(71) Applicant: Gamma2Robotics, Lakewood, CO (US)

(72) Inventors: Francis Govers, Lakewood, CO (US); Lewis Pincus, Lakewood, CO (US); Jeffery Pasquale, Lakewood, CO (US)

(73) Assignee: GAMMA 2 ROBOTICS, Lakewood, CO (US)

( * ) Notice: Subject to any disclaimer, the term of this patent is extended or adjusted under 35 U.S.C. 154(b) by 0 days.

(21) Appl. No.: 15/621,920

(22) Filed: Jun. 13, 2017

(65) Prior Publication Data

US 2017/0358201 A1   Dec. 14, 2017

Related U.S. Application Data

(60) Provisional application No. 62/349,250, filed on Jun. 13, 2016, provisional application No. 62/349,251, (Continued)

(51) Int. Cl.
    *G08B 29/00* (2006.01)
    *G08B 29/18* (2006.01)
    (Continued)

(52) U.S. Cl.
    CPC .......... *G08B 29/188* (2013.01); *B25J 9/1694* (2013.01); *G08B 31/00* (2013.01); *H04L 67/12* (2013.01)

(58) Field of Classification Search
    CPC ........ G08B 17/00; G08B 25/14; G08B 25/10; G08B 29/06; G08B 3/10; G08B 13/08; B60K 35/00; B60Q 1/22; G06N 3/008; B62D 57/032; B23K 9/1274

USPC ....... 340/587, 506, 507, 540, 545.2, 539.26, 340/438, 463; 700/245; 901/1, 9, 10, 46
    See application file for complete search history.

(56) References Cited

U.S. PATENT DOCUMENTS

| | | | |
|---|---|---|---|
| 6,459,955 B1 * | 10/2002 | Bartsch | ..................... A47L 9/00 318/568.11 |
| 8,732,100 B2 | 5/2014 | Blowers et al. | |

(Continued)

OTHER PUBLICATIONS

International Search Report and Written Opinion of PCT/US2017/037323, dated Aug. 23, 2017, all pages.

*Primary Examiner* — George Bugg
*Assistant Examiner* — Munear Akki
(74) *Attorney, Agent, or Firm* — Kilpatrick Townsend & Stockton LLP

(57) ABSTRACT

The present technology generally relates to robotics. More specifically, the present technology relates to systems and methods for reducing false alarms by a mobile robotic device using data collected by sensors in the robotic device. An example of the technology may include receiving sensor data at one or more sensors; determining a first portion of the sensor data that matches one or more positive logic patterns of the set of positive logic patterns; determining a second portion of the sensor data that matches one or more negative logic patterns of the set of negative logic patterns; determining a third portion of sensor data that does not match any positive logic patterns of the set of positive logic patterns or negative logic patterns of the set of negative logic patterns; generating an alarm decision; receiving an input indicating that the alarm decision was incorrect; linking the alarm decision and the input to each other; and transmitting the linked alarm decision and input to the second pattern library based on the input.

20 Claims, 21 Drawing Sheets

Related U.S. Application Data filed on Jun. 13, 2016, provisional application No. 62/349,252, filed on Jun. 13, 2016, provisional application No. 62/365,531, filed on Jul. 22, 2016, provisional application No. 62/432,349, filed on Dec. 9, 2016, provisional application No. 62/432,352, filed on Dec. 9, 2016, provisional application No. 62/432,355, filed on Dec. 9, 2016, provisional application No. 62/440,587, filed on Dec. 30, 2016, provisional application No. 62/440,812, filed on Dec. 30, 2016, provisional application No. 62/441,094, filed on Dec. 30, 2016.

(51) Int. Cl.
    *G08B 31/00*     (2006.01)
    *H04L 29/08*     (2006.01)
    *B25J 9/16*     (2006.01)

(56) References Cited

U.S. PATENT DOCUMENTS

| | | | |
|---|---|---|---|
| 9,024,771 B1* | 5/2015 | Kuffner, Jr. | G08B 21/18 340/679 |
| 2002/0073333 A1* | 6/2002 | Palka | H04L 41/06 726/11 |
| 2006/0184277 A1* | 8/2006 | Decuir | G10L 17/00 700/245 |
| 2006/0293789 A1* | 12/2006 | Frazier | G08B 13/194 700/245 |
| 2010/0030378 A1* | 2/2010 | Choi | G01S 1/54 700/245 |
| 2011/0254681 A1 | 10/2011 | Perkinson et al. | |
| 2012/0271782 A1 | 10/2012 | Blowers et al. | |
| 2013/0338525 A1* | 12/2013 | Allen | A61B 5/1135 600/534 |
| 2015/0019016 A1* | 1/2015 | Aguerre | B25J 9/1674 700/260 |
| 2015/0066208 A1* | 3/2015 | Lu | B25J 9/1676 700/259 |
| 2015/0271991 A1* | 10/2015 | Balutis | A01D 34/008 700/264 |
| 2016/0025850 A1 | 1/2016 | Rigsby et al. | |
| 2016/0217627 A1* | 7/2016 | Khalaschi | G07C 5/0808 |
| 2016/0218911 A1* | 7/2016 | Wessels | H04L 41/0609 |
| 2016/0271793 A1* | 9/2016 | Inaba | H04W 4/023 |
| 2017/0066130 A1* | 3/2017 | Corkum | B25J 9/1651 |
| 2017/0120460 A1* | 5/2017 | Burmeister | B25J 19/06 |

* cited by examiner

METHODS AND SYSTEMS FOR REDUCING FALSE ALARMS IN A ROBOTIC DEVICE BY SENSOR FUSION

CROSS-REFERENCES TO RELATED APPLICATIONS

The present application claims the benefit of priority to the following U.S. Provisional Applications, which are hereby incorporated by reference in their entireties for all purposes:

U.S. Provisional Application No. 62/349,250, filed Jun. 13, 2016;
U.S. Provisional Application No. 62/349,251, filed Jun. 13, 2016;
U.S. Provisional Application No. 62/349,252, filed Jun. 13, 2016;
U.S. Provisional Application No. 62/365,531, filed Jul. 22, 2016;
U.S. Provisional Application No. 62/432,349, filed Dec. 9, 2016;
U.S. Provisional Application No. 62/432,352, filed Dec. 9, 2016;
U.S. Provisional Application No. 62/432,355, filed Dec. 9, 2016;
U.S. Provisional Application No. 62/440,587, filed Dec. 30, 2016;
U.S. Provisional Application No. 62/440,812, filed Dec. 30, 2016; and
U.S. Provisional Application No. 62/441,094, filed Dec. 30, 2016.

TECHNICAL FIELD

The present technology generally relates to robotics. More specifically, the present technology relates to systems and methods for reducing false alarms by a mobile robotic device using data collected by sensors in the robotic device.

SUMMARY

The present technology generally relates to robotics. More specifically, the present technology relates to systems and methods for reducing false alarms by a mobile robotic device using data collected by sensors in the robotic device. In an embodiment, a method for reducing false alarms in a robotic device using sensor fusion is disclosed. The method may include, for example, receiving sensor data at one or more sensors of a robot at a first location of an environment, wherein the sensor data indicates a detection event associated with an object in the environment; determining, based on the sensor data and a set of positive logic patterns in a first pattern library, a first portion of the sensor data that matches one or more positive logic patterns of the set of positive logic patterns; determining, based on the sensor data and a set of negative logic patterns in a second pattern library, a second portion of the sensor data that matches one or more negative logic patterns of the set of negative logic patterns; determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns; generating, using the first, second and third portions of data, an alarm decision, wherein the alarm decision includes a decision of whether the sensor data indicates that the detection event took place; receiving an input indicating that the alarm decision was incorrect; linking the alarm decision and the input to each other; and transmitting the linked alarm decision and input to the second pattern library based on the input, wherein when the linked alarm decision and input are received, the set of negative logic patterns is updated to include the linked alarm decision and input.

In an aspect of any of the above embodiments, the method may further include linking the alarm decision and the input to the sensor data; and transmitting the linked sensor data, alarm decision, and input to the second pattern library based on the input, wherein when the linked sensor data, alarm decision, and input are received, the set of negative logic patterns is updated to include the linked sensor data, alarm decision, and input. In an aspect of any of the above embodiments, the updated set of negative logic patterns is used to make future alarm decisions. In an aspect of any of the above embodiments, the alarm decision facilitates initiating an alarm being activated to notify a user of the alarm decision. In an aspect of any of the above embodiments, the set of positive logic patterns and the set of negative logic patterns are determined using and associated with the detection event. In an aspect of any of the above embodiments, the set of positive logic patterns and the set of negative logic patterns are mutually exclusive from each other. In an aspect of any of the above embodiments, the received input indicates that the alarm decision was incorrect is a false positive.

In another embodiment, a robotic device is disclosed. The robotic device may include, for example, one or more processors, and a memory having instructions stored thereon. The instructions may, when executed by the one or more processors, cause the computing device to perform operations including: receiving sensor data at one or more sensors of a robot at a first location of an environment, wherein the sensor data indicates a detection event associated with an object in the environment; determining, based on the sensor data and a set of positive logic patterns in a first pattern library, a first portion of the sensor data that matches one or more positive logic patterns of the set of positive logic patterns; determining, based on the sensor data and a set of negative logic patterns in a second pattern library, a second portion of the sensor data that matches one or more negative logic patterns of the set of negative logic patterns; determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns; generating, using the first, second and third portions of data, an alarm decision, wherein the alarm decision includes a decision of whether the sensor data indicates that the detection event took place; receiving an input indicating that the alarm decision was incorrect; linking the alarm decision and the input to each other; and transmitting the linked alarm decision and input to the second pattern library based on the input, wherein when the linked alarm decision and input are received, the set of negative logic patterns is updated to include the linked alarm decision and input.

In an aspect of any of the above embodiments, the operations may further include linking the alarm decision and the input to the sensor data; and transmitting the linked sensor data, alarm decision, and input to the second pattern library based on the input, wherein when the linked sensor data, alarm decision, and input are received, the set of negative logic patterns is updated to include the linked sensor data, alarm decision, and input. In an aspect of any of the above embodiments, the updated set of negative logic patterns is used to make future alarm decisions. In an aspect of any of the above embodiments, the alarm decision facilitates initiating an alarm being activated to notify a user of the alarm decision. In an aspect of any of the above embodiments, the set of positive logic patterns and the set of negative logic patterns are determined using and associated with the detection event. In an aspect of any of the above embodiments, the set of positive logic patterns and the set of negative logic patterns are mutually exclusive from each other. In an aspect of any of the above embodiments, the received input indicates that the alarm decision was incorrect is a false positive.

In another embodiment, a non-transitory computer readable storage medium is disclosed. The non-transitory computer readable storage medium may be communicatively coupled to one or more processors. The non-transitory computer readable storage medium may include instructions that, when executed by the one or more processors, cause the one or more processors to perform operations including: receiving sensor data at one or more sensors of a robot at a first location of an environment, wherein the sensor data indicates a detection event associated with an object in the environment; determining, based on the sensor data and a set of positive logic patterns in a first pattern library, a first portion of the sensor data that matches one or more positive logic patterns of the set of positive logic patterns; determining, based on the sensor data and a set of negative logic patterns in a second pattern library, a second portion of the sensor data that matches one or more negative logic patterns of the set of negative logic patterns; determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns; generating, using the first, second and third portions of data, an alarm decision, wherein the alarm decision includes a decision of whether the sensor data indicates that the detection event took place; receiving an input indicating that the alarm decision was incorrect; linking the alarm decision and the input to each other; and transmitting the linked alarm decision and input to the second pattern library based on the input, wherein when the linked alarm decision and input are received, the set of negative logic patterns is updated to include the linked alarm decision and input.

In an aspect of any of the above embodiments, the operations may further include linking the alarm decision and the input to the sensor data; and transmitting the linked sensor data, alarm decision, and input to the second pattern library based on the input, wherein when the linked sensor data, alarm decision, and input are received, the set of negative logic patterns is updated to include the linked sensor data, alarm decision, and input. In an aspect of any of the above embodiments, the updated set of negative logic patterns is used to make future alarm decisions. In an aspect of any of the above embodiments, the alarm decision facilitates initiating an alarm being activated to notify a user of the alarm decision. In an aspect of any of the above embodiments, the set of positive logic patterns and the set of negative logic patterns are determined using and associated with the detection event. In an aspect of any of the above embodiments, the set of positive logic patterns and the set of negative logic patterns are mutually exclusive from each other. In an aspect of any of the above embodiments, the received input indicates that the alarm decision was incorrect is a false positive.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

A further understanding of the nature and advantages of the disclosed embodiments may be realized by reference to the remaining portions of the specification and the drawings.

Figure 1:
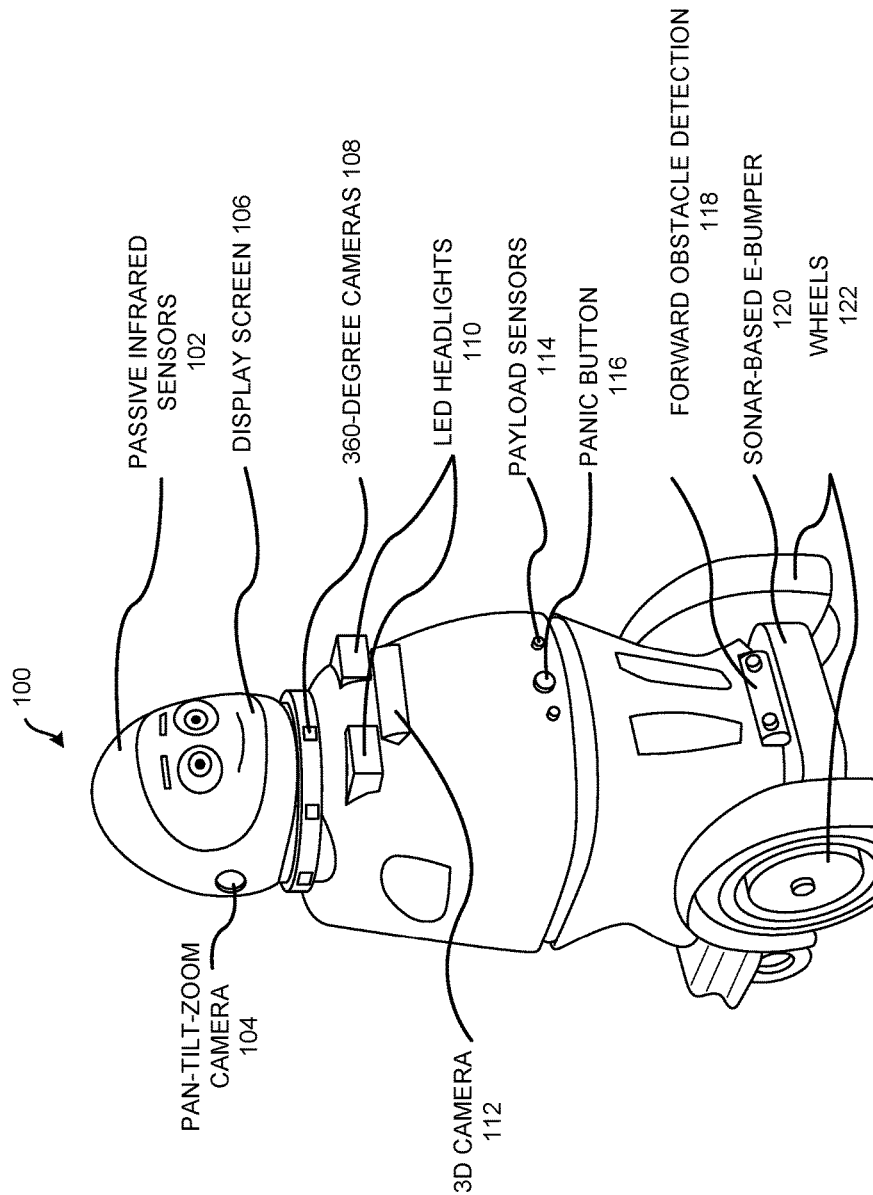
FIG. 1 shows a robot in accordance with embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemple embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 shows a robotic device (e.g. robot) 100, according to embodiments of the present technology. Robot 100 may include a variety of devices and systems. For example, robot 100 may include a variety of sensors that may collect data associated with the environment that robot 100 is located in. More specifically, robot 100 may include one or more sensors such as one or more infrared (IR) sensors 102 (e.g. FLIR, forward looking infrared), one or more 3D sensors 112 (e.g. 3D camera), and/or one or more LiDAR sensors 118. These sensors may collect data over time across a wide range of geographic locations. For example, the one or more infrared sensors 102 (e.g. passive infrared sensors) may detect thermal or other data associated with people or other objects across a 360 degree view around the robot 100. More specifically, the infrared sensors 102 may detect motion of IR wavelengths associated with humans. The infrared sensors 102 may therefore, for example, determine a distance between the infrared sensor 102 (and therefore the robot 100, which the infrared sensor 102 is attached to) and an object near the robot 100, such as a person. In another example, one or more 3D sensors 112 may detect 3D objects in its field of view across, for example, a 60 degree field of view around the robot 100. More specifically, the one or more 3D camera sensors 112 may detect and/or generate a point cloud, or a group of points in 3D space, associated with objects that the one or more 3D camera sensors 112 can see in their field of vision. In another example, one or more LiDAR sensors 118 may detect objects using surveying technology to measure distance (e.g. by illuminating the object with a laser light) across, for example, a 180 degree field of view around the robot 100. The LiDAR may also detect range or an angle from which the object is with respect to the sensor (and therefore the robot 100). Robot 100 may also include, for example, one or more 360-degree cameras 108, or other sensors.

Robot 100 may also include a variety of other devices and systems. Robot 100 may include, for example, other cameras, such as one or more pan-tilt-zoom cameras 104 and/or one or more payload sensors, such as payload sensors 114. Robot 100 may also include, for example, one or more displays, such as a touch screen display 106 that may be used for video conference and operation of the robot 100, one or more headlights such as LED headlights 110, one or more panic buttons such as panic button 116, one or more bumpers such as sonar-based e-bumper 120, and/or one or more wheels such as wheels 122 (which may include, for example, one or more brushless motors). Other devices and sensors may also be included as part of robot 100, such as audio sensors (e.g. acoustic, sound, vibration, etc., such as microphones), liquid or liquid flow sensors, temperature sensors, touch sensors, chemical sensors, electric or electronic sensors (e.g. electric current, electric potential, magnetic, radio, etc.), acceleration sensors (accelerometer, gyroscope, etc.), optical sensors (light, imaging, photon, etc.), pressure, force or density sensors, among others. Robot 100 may also be configured to join with other structures that may become a part of robot 100, and therefore may include mounting points for one or two (or more) arms, extendable mast (e.g. with one or more sensors attached to it), firefighting equipment (e.g. extinguishers, hoses, etc.), extra sensors or display devices, among others.

Note that each of the devices and systems that make up robot 100, whether shown in FIG. 1 or otherwise, may be located in a variety of different locations within robot 100 as understood by a person of ordinary skill in the art. For example, the sensors shown in FIG. 1 may be located at a different location on or within robot 100, depending on the robot or the purpose and functionality of same.

The data collected by the various sensors may be used by robot 100 to perform various functions, such as including (but not limited to) monitoring, security, inventory, fire detection and expulsion, among many other functions. The robot may also use the data collected to learn about the environment that it is located in and become smarter over time about that environment and obstacles that it might encounter in the environment while it moves around the environment. For example, robot 100 may become smarter about security, including when to indicate an alarm and how to prevent false alarms.

Figure 2:
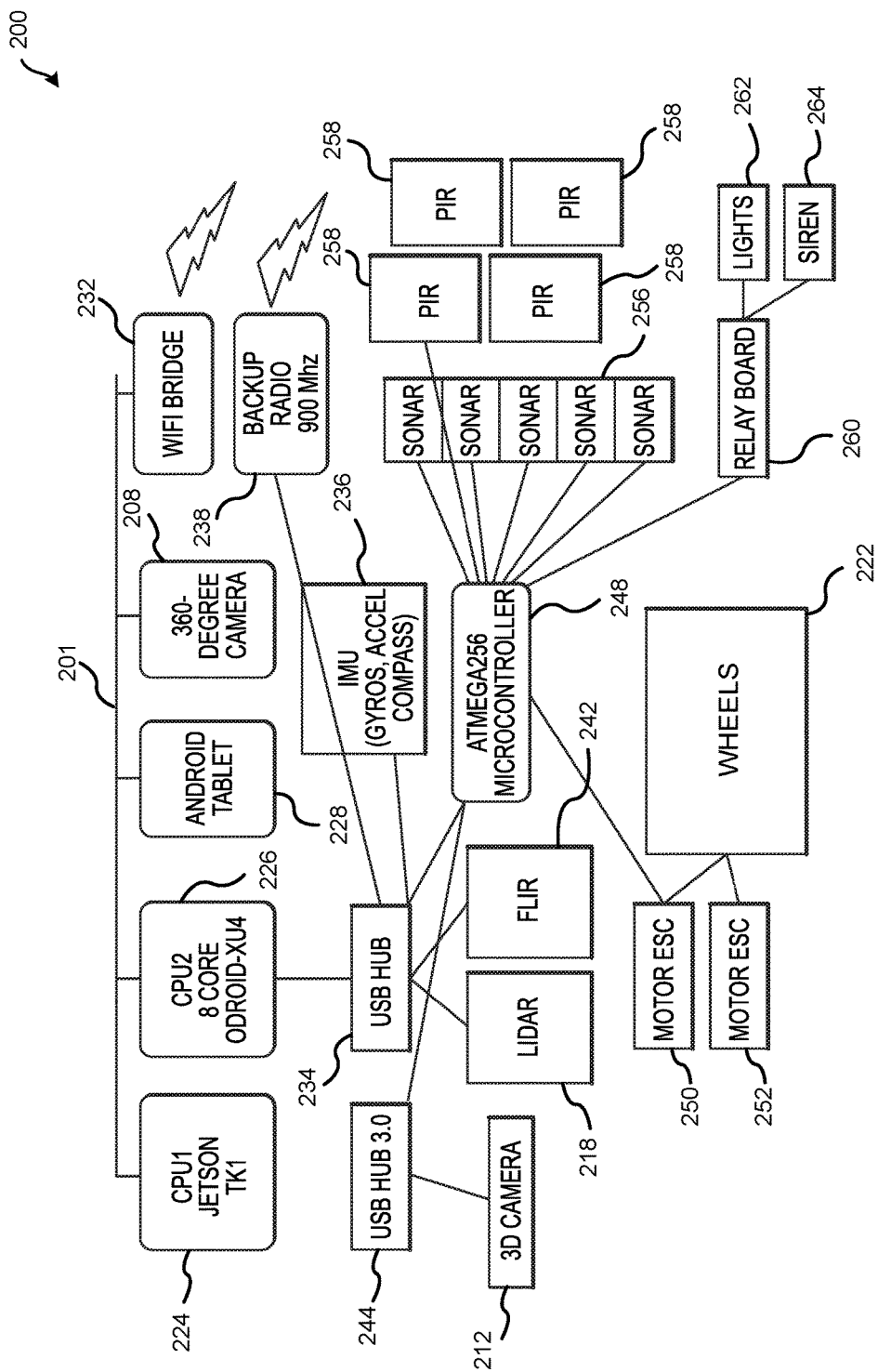
FIG. 2 illustrates a block diagram with a system bus that connects the internal components of the systems and devices within a robot, according to embodiments of the present technology.

FIG. 2 shows a block diagram 200 with a system bus 201 that connects the internal components of the systems and devices within robot 100, according to embodiments of the present technology. System bus 201 may include a variety of devices, such as specialized computers 224 and 226. Computers 224 and 226 may run software that controls the various functions of robot 100, such as using its sensors to gather data about its environment. Different types of computers and other devices may also be located on system bus 201, such as mobile devices. Such mobile devices may include mobile phones, tablets (such as android tablet 228), among others. System bus 201 may also include sensors from within robot 100, such as a camera (e.g. 360-degree camera 208). The various devices and systems within robot 100, some of which are shown on system bus 201, may communicate with each other via a variety of communication protocols. For example, devices may communicate via WiFi using a WiFi bridge such as WiFi bridge 232. The devices may communicate via a variety of other protocols, such as 3G, 4G, Bluetooth, ZigBee, among others.

Other systems and devices included in robot 100 may be connected to computers 224 and 226, mobile devices 228, or other devices via system bus 201, or may be connected directly to one of the computers 224 and 226 via one or more USB hubs, such as USB bubs 234 and 244. For example, a variety of sensors, such as the sensors discussed herein with respect to robot 100 in FIG. 1, may be connected as shown in FIG. 2 to computer 226 via USB hub 234. As shown in block diagram 200, various sensors such as LiDAR sensor 218, forward looking infrared sensor 242, 3D camera 212, inertial measurement units (IMUs), such as gyroscopes, accelerometers, compasses, etc., among others. A microcontroller, such as microcontroller 248 (e.g. ATmega256 microcontroller), may also be connected to computer 226 via USB hub 234. The microcontroller 248 may control various other functions of the robot, such as motors 250 and 252, wheels 222 via the motors, sonar sensors 256, passive infared (PIR) sensors 258, and/or lights 262 and siren 264 via relay board 260.

Robot 100 may include a variety of other systems and devices, such as sensor devices, not shown in block diagram 200 in FIG. 2. Each of these devices may be interconnected and work together to perform the functions of the robot.

Figure 3:
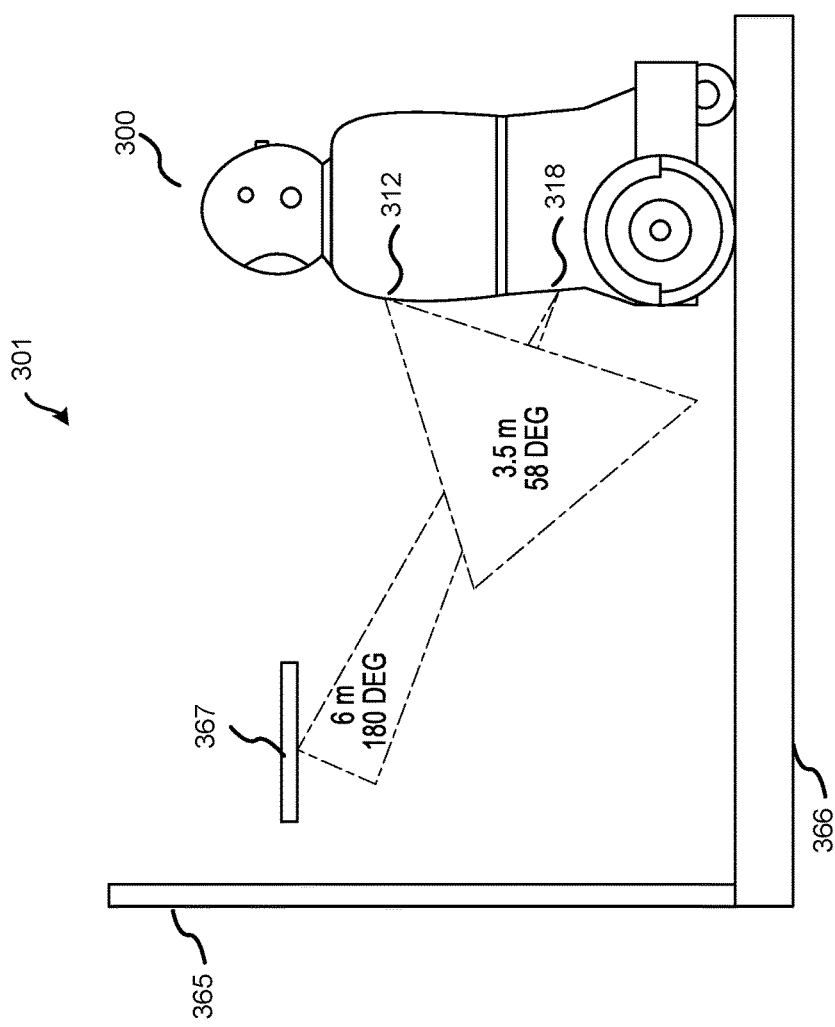
FIG. 3 shows a robot in an environment and using its sensors to view the surrounding environment, according to embodiments of the present technology.

FIG. 3 shows a robot 300 in an environment 301 and using its sensors to view the surrounding environment, according to embodiments of the present technology. As noted, robot 300 may include a variety of sensors that collect data associated with the environment 301 in which the robot 300 is located. For example, robot 300 may include a 3D camera 312 and/or a LiDAR camera 318 that are observing environment 301 and collecting data associated with that environment. In viewing the environment, 3D camera 312 and/or LiDAR camera 318 may have different perspectives based on their location and orientation as mounted on or within robot 300, and may have different ranges based on the different capabilities of the different sensor devices. For example, 3D camera 312 may be mounted on the front and towards the top of the robot 300 as shown in FIG. 3. 3D camera 312 may also be angled downward towards the ground 366 at a certain predetermined angle. 3D camera 312 may also have a predetermined distance range (distance of sight) based on the capability of the camera sensor (e.g. 3.5 meters, as shown in FIG. 3). In another example, LiDAR camera 318 may be mounted on the front and towards the bottom of the robot 300 as shown in FIG. 3. LiDAR camera 318 may also have a predetermined distance range based on the capability of the camera sensor. As shown in FIG. 3, the distance range of LiDAR camera 318 (e.g. 6 meters) may be greater than the range of 3D camera 312. LiDAR camera 318 may also be angled upward towards the wall 365 at a certain predetermined angle. The camera sensors may also have different side-to-side viewing range (e.g. in degrees off center). For example, as shown in FIG. 3, 3D camera 312 may have a viewing range of 58 degrees from center while the LiDAR camera 318 may have a range of 180 degrees from center.

As robot 300 moves through an environment, the different sensors may view different portions of the environment and therefore different objects, and therefore may collect different data over time as it moves based on the environment robot 300 is in at any given moment. As shown in FIG. 3, the views of the camera sensors may overlap. The sensors may also have different capabilities as described herein so that a different combination of sensors may be used to detect different variable types of data for different purposes.

Figure 4:
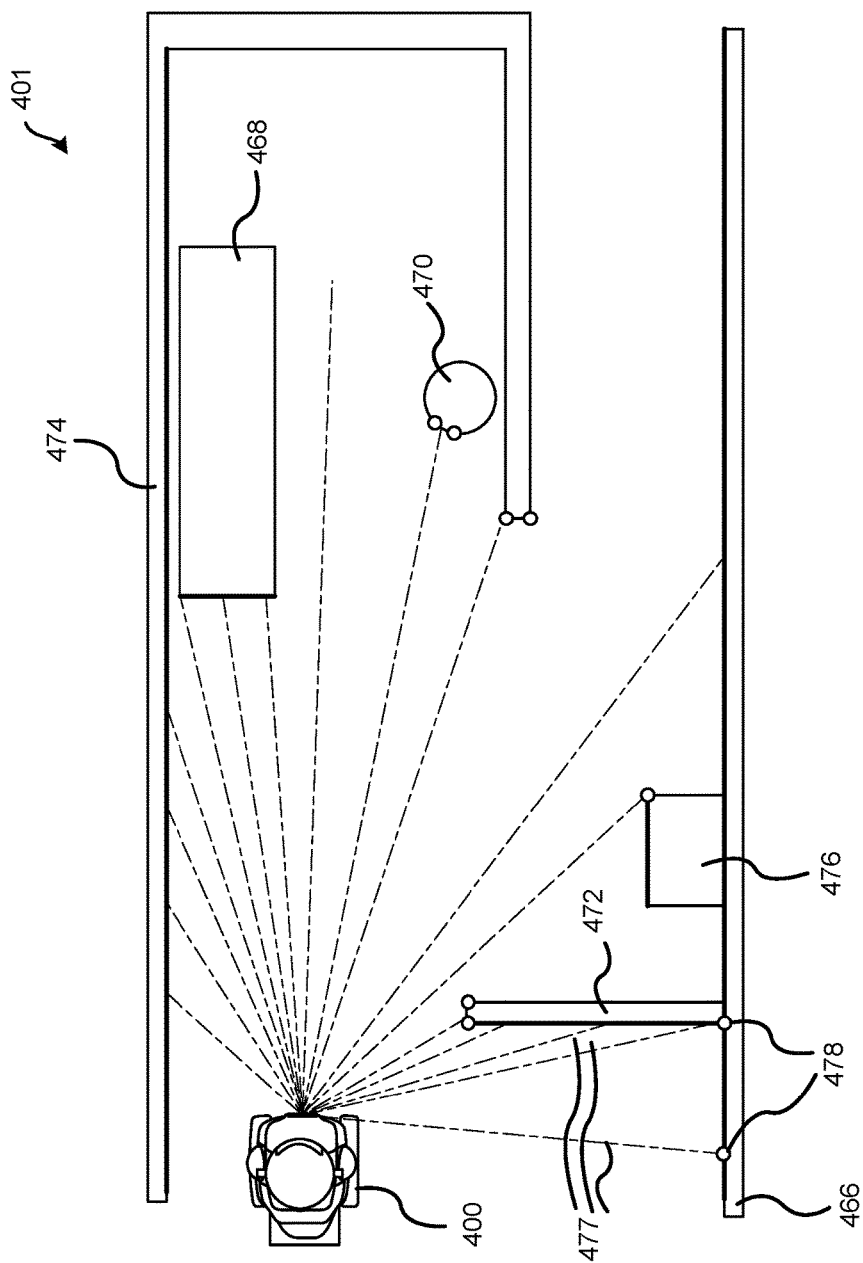
FIG. 4 shows an environment including a robot, according to embodiments of the present technology.

FIG. 4 shows an environment 401 including a robot 400, according to embodiments of the present technology. As shown in FIG. 4, robot 400 is at a certain location within environment 401, and the sensors that make up robot 400 may observe the environment 401 from the position that robot 400 is in. For example, a camera sensor located on the front of robot 400 may observe the environment 401 with a certain perspective from its location on robot 400 based on the robot's location in the environment 401.

As robot 400 moves through environment 401 and is located at a particular position within environment 401, it has various lines of sight 477 that represent the objects that it sees in its path. For example, certain lines of sight may be directly in front of robot 400, and other lines of sight may be at a variety of different angles off of the center line of the robot's path. For example, robot 400 may have a line of sight that is at a 90 degree angle from the center of its path to the right or to the left of the robot, or at any angle in between. From a particular position within environment 401, robot may view various objects. Certain objects may be selected as landmarks, which the robot 400 can use to generate a map of the environment 401. For example, the map may include walls, a ceiling, and other objects in the environment.

These objects in the environment 401 may be designated as hardscapes, such as objects 466 and 474 (e.g. walls), or objects that are immovable. On the other hand, objects in the environment 401 may be designated as softscapes, such as objects 469 (e.g. a table), 478 (e.g. a chair), 476 (e.g. a file cabinet), and 472 (e.g. a removable wall), or objects that usually stand still but are movable if necessary. Other objects within environment 401 may include mobile objects such as people (not shown). Sensors within robot 400 may generate a point cloud, which may include various points 478 in 3D space that are each associated with an object (either hardscapes or softscapes). This point cloud allows robot 400 to identify objects in the environment, to differentiate between hardscapes and softscapes, and map those objects on a map of the environment. For example, robot 400 may discard softscapes or objects that don't appear to be permanent in the environment when generating a map. Robot 400 may detect whether an object is permanent by using various analysis techniques, such as object recognition, or by comparing different perspectives of the environment over time (e.g. if the object moves over time) and by using other nearby objects.

Robot 400 may generate a map of the environment 401 over time. For example, robot 400 may identify various objects and other aspects of the environment 401 during an initial movement or path through the environment. After those initial objects and aspects have been applied to a map of the environment, robot 400 may change the map over time based on newly discovered objects (e.g. objects that the sensors of robot 400 did not see or identify during the initial path), newly discovered aspects of objects already discovered, changes in the environment since the last path through the environment that the robot took (old landmarks seen again, old landmarks no longer seen, etc.), and other details. Robot 400 may determine how much each object or portion of the environment has changed over time. The map and continuous updating of the map may allow robot 400 to travel through the environment while obtaining a deep understanding of both the environment and the tendencies and patterns of objects in the environment. Based on these tendencies and patterns, robot 400 may alert a person or other outside system of a problem or other issue with the environment, such as an intruder, fire, or other damaging state.

When an event occurs, the event may be deemed to be "normal" or "abnormal" based on the history of that event occurring, the environment in which the event occurs, or other factors. If the event is "normal", then the event may not be interesting, remarkable, or otherwise worthy of attention. However, if the event is "abnormal", then the event may be worthy of attention for a variety of reasons. For example, an abnormal event may indicate that there is a problem in the environment. More specifically, for example, if an environment is very hot, then fire may be present, and fire may cause damage to the environment. In another specific example, if an environment includes water, especially if the environment does not normally include water, then the environment may be flooding. If the environment has a problem, then the environment may require attention from someone (e.g. a professional who deals with that type of problem) to prevent the problem from spreading or doing damage. In order for the problem to be prevented or ceased, a person may need to be notified of the problem or of information associated with the problem.

There are many ways in which a decision can be made about whether that event is "normal" or "abnormal". One example method of determining whether the event is abnormal is for a person to be present in the environment and for the person to use the person's senses to determine whether the event is abnormal. For example, it may be easy for a person to detect whether a fire is present in the environment because the person may see the fire, feel the heat from the fire, hear the fire, etc. However, if a person is not present in the environment, or if the characteristics of the problem are more subtle or undetectable by a person, then other methods may be used. For example, data associated with the environment, and therefore data associated with the event and a potential problem, may be collected and analyzed to determine if the event is abnormal. In one example, a specialized computer with a specialized processor may receive data associated with the environment, and analyze the data to determine if the event is abnormal based on the data.

In some situations, a specialized computer may be making a decision that a person may have otherwise been able to make without the computer analyzing the data, but the decision would require the person to be present in the environment. However, when a computer processes large amounts of data and must make a decision based on the data, such as whether the data indicates that the event is abnormal (i.e. that the environment has a problem), the decision that the computer makes may or may not correspond to the decision that a person would have made if the person were present in the environment (i.e. a false positive). If the decision that the computer makes does not correspond to the decision that a person would have made if the person were present in the environment, then the decision contributes to making the computer, and the decision making process overall, less efficient. Therefore, the decision may need to be corrected for that inefficiency to be rectified. If the computer learns over time which decisions it has made are correct (i.e. positive) decisions and which decisions it has made are incorrect (i.e. negative) decisions, the computer may "learn" over time how to make fewer and fewer incorrect decisions, and therefore how to make more and more correct decisions.

Furthermore, in some other situations, a computer may be making a decision that the person may not have been able to make without the computer analyzing the data. For example, the computer may receive or collect data associated with the environment that a person may not be able to detect or process because the data is outside of the scope of the senses that a person possesses (e.g. odorless, but harmful, gas). In another example, the computer may receive or collect data associated with the environment that a person may not be able to detect or process because while the data is technically detectable by one or more senses of a person, the data is of a higher or lower magnitude than the magnitude of the senses that a person is able to detect (e.g. heat at a distance or through a wall).

As described in, for example, FIG. 2, one situation in which a specialized computer may receive or collect data is within a robot, such as robot 100. For example, the robot may collect data using sensors included within or connected to the robot, where the data is associated with the environment in which the robot is located. As described further below with respect to FIG. 5, the robot may not only process this data to make decisions about the environment of the robot, but the robot may, using its internal specialized computer, learn and become smarter over time by using feedback regarding its correct and incorrect decisions so that eventually the robot makes no or very few incorrect decisions.

Figure 5:
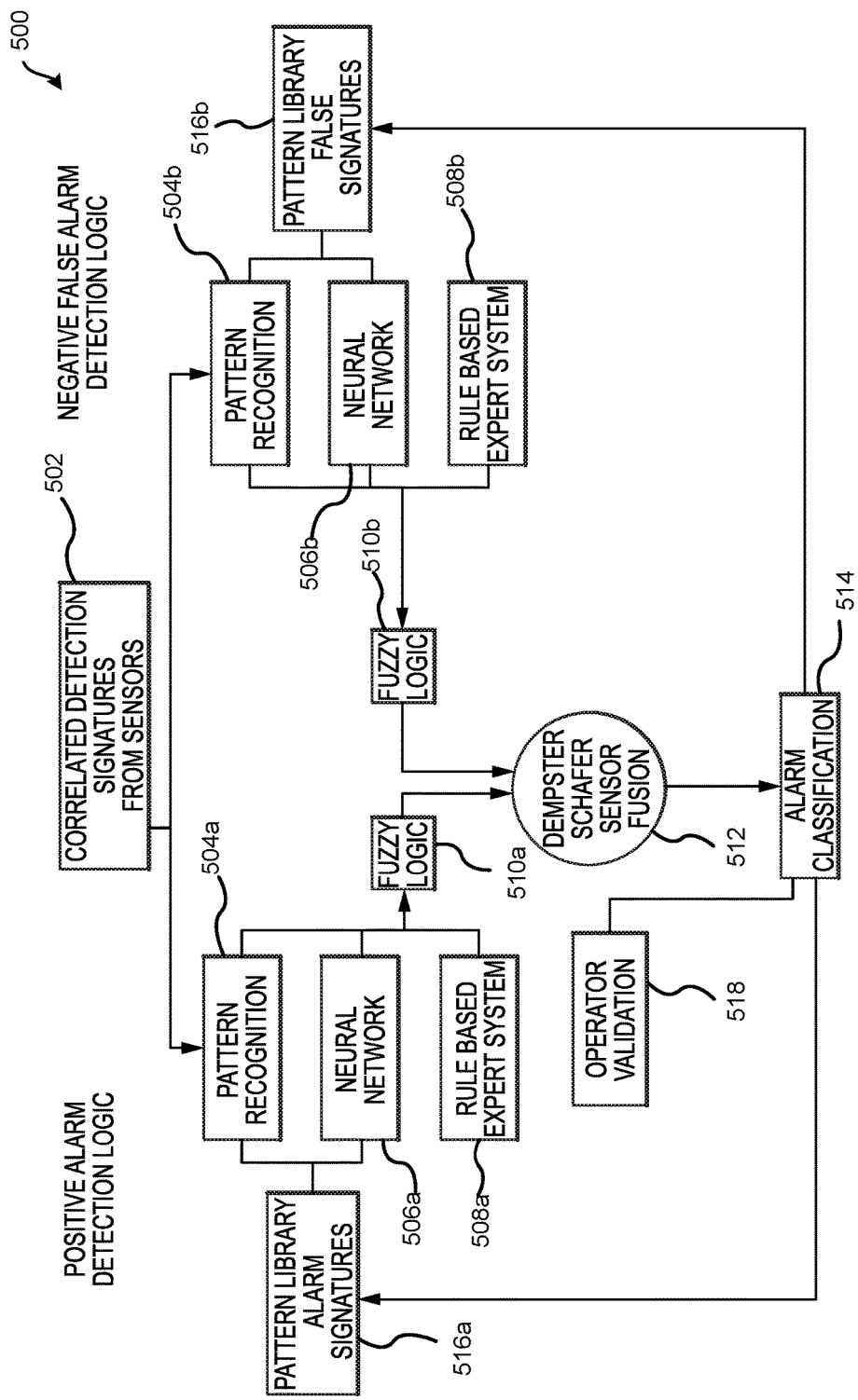
FIG. 5 shows a block diagram illustrating an example process for reducing false alarms by a robot using sensor fusion, according to embodiments of the present technology.

FIG. 5 shows a flow chart 500 illustrating an example process for reducing false alarms by a robot using sensor fusion, according to embodiments of the present technology. As noted, a robot according to embodiments of the present technology may determine, using its sensors, that an event, which may be a problem or error, takes place in an environment. The robot may collect data associated with its environment using sensors included within or connected to the robot. For example, the set of data collected in the environment may be called a "signature". The robot may store the set of data (signature) associated with this determination (e.g. the determination and the situation or data that led to that determination), or may generate an alarm or alert to notify a user of the robot that a problem exists in an environment. For example, the robot may indicate that a fire is present. In another example, the robot may indicate that a person (e.g. an intruder) has entered the environment. In this example, the robot may use a 3D LIDAR radar, visible light camera, infrared camera, and/or 3D camera that has night vision to detect a person. In another example, the robot may indicate that certain objects are out of place and may cause a problem later. However, if the robot determines that the event is a problem, and therefore generates an alarm or alert, even if the event does not indicate an actual a problem, then the robot may be inefficient or counterproductive.

The "alarm" or "notification" described herein with respect to the robot reporting an event, the alarm or notification may include the robot transmitting a signal to a user, including the user's mobile device. The alarm or notification may also be transmitted to a display device or to another type of device connected to one or more of the robot's wireless or wired networks so as to allow the robot to notify a user or a device of the event.

The signature set of data may be composed of a portion of data that represents a signal (i.e. the part of the set of data that is indicative of the event, such as fire, a person, etc.), and another portion of data that is noise. Noise may be caused by the mechanics of the sensor system, the digitation process (e.g. when the sensor data is turned into digital data that can be understood by the computers within the robot), sampling error (e.g. caused by not all of the data being available at the same time), quantization error (e.g. caused by not having enough bits to encode all of the data), among other causes. The role of the false alarm detection (or determination) system is to correctly discern between the signal data and the noise data. The system may also need to categorize the signal to determine what type of alarm to sound based on the type of problem event that it detected (e.g. an intruder alarm for a detected unknown person).

To reduce false alarms, a robot may combine various data (i.e. pieces of information) from different sources (e.g. sensors) over time and analyze that information to make the robot's triggers to generate alarms more accurate. To analyze collected data, belief calculus may be used. Belief calculus includes making a decision with three different analyses. First, positive or indefeasible reasoning may be used, which considers evidence to lead the robot to conclude that it should set an alarm (positive evidence, or the signal/signature data). For example, if a robot is detecting a fire, the robot collects data associated with what characteristics are relevant to fire, and to what degree each of the pieces of data (e.g. sensor readings) belong to the set of things relevant to fire (i.e. the family of alarms). Second, negative or defeasible reasoning may be used, which considers the evidence to lead the robot to conclude that the robot should not set an alarm (negative evidence, or noise data). For example, if a robot is detecting a fire, the robot collects data associated with what characteristics are relevant to there not being a fire, and to what degree each of the pieces of data belong to the set of things not relevant to a fire (i.e. the family of false alarms). Third, analysis may be performed to determine that the robot does not have enough data to make decision. A processor within the robot may combine these three analyses and possible beliefs (e.g. using an area function) to determine which result is most likely. For example, fuzzy logic may be used to determine which of the beliefs (positive/alarm, negative/no alarm, or unknown) is most likely based on the data.

As shown in FIG. 5, block diagram and flow chart 500 includes two similar processes on either side of the flow chart (except for the operator validation 200 function), where one side of the flow chart applies to positive alarm detection logic and the other side of the flow chart applies to negative alarm detection logic. Each side of the flow chart may include one or more detection or classification modules, such as, for example, pattern recognition (e.g. 504a and 504b), artificial neural network, or just neural network (e.g. 506a and 506b), and rule based expert systems, or just expert systems (e.g. 508a and 508b). However, it should be understood by a person of ordinary skill in the art that these modules may be added to or replaced with other detection or classification modules. For example, the algorithm may be able to handle any number of modules (e.g. as long as they hold to the same interface standard and produce the proper information needed by the summation processes, such as the fuzzy logic modules 510a and 510b). The detection or classification modules include, for example, different detection methods or analyses to be inputted into the fuzzy logic combination engine that makes an initial decision on whether the data being analyzed represents a certain event.

On the positive alarm detection logic side of diagram 500, the diagram includes block 502 which includes collecting data (e.g. correlated detection signatures) at sensors of the robot. The signature data collected in module 502 and sent to the detection or classification modules, such as pattern recognition module 504a, may include raw data detected by the sensors of the robot. On the other hand, the data fed into the pattern recognition module 504a may include data filtered from the raw sensor data using one or more algorithms designed to determine which data is associated with certain events that the system may be looking for. For example, if a portion of the system is trying to detect people (e.g. intruders), then a facial recognition or other person recognition algorithm may be run on the raw sensor data to determine the subset of data that appears to be associated with a person. More specifically, such an algorithm may exclude data that is collected by a sensor that is associated with a wall or a chair because that data is no relevant to detecting a person, such as a possible intruder.

Along with this data, pattern library alarm signatures are inputted from block 516a into pattern recognition block 504a. Pattern recognition box 504a is configured to analyze data received from box 502 (e.g. from sensor on the robot or otherwise) using the pattern library received from box 516a to determine if the data fits any of the patterns from the pattern library. For example, pattern recognition analysis may include determining if the data indicates that the robot detects a temperature above a certain predetermined threshold such that a fire may exist, or determining if data associated with an object indicates that the robot detects a human being present at a certain location near the robot.

Various different types and numbers of variables may exist for each pattern recognition decision. For example, a decision may include one or two variables, where data is compared to a predetermined threshold. In another example, more complex decisions may include facial recognition, audio recognition, or other algorithms. Variables may include, for example, temperature, time of day, day of week, time of year (seasons, type of clothing being worn), duration, etc. For example, if the robot is detecting whether or not a fire exists, the patterns will include different characteristics of fire. For example, data from sensor such as IR, smoke detector, gas detector, and others may be used to determine whether certain characteristics of fire exist. Each sensor may have many different patterns. The pattern recognition decision may ultimately depend on whether the characteristics and variables included in that pattern indicate that a problem has been detected.

To detect patterns, the pattern recognition engine may use different techniques, such as a Histogram of Oriented Gradients ("HOG") detector. The HOG process may divide an image or data into small squares, and determine the orientation of any edges that might be found in the square. A human body, which has a head, shoulders, arms and legs, has a certain distribution of these edges, which is counted using a histogram, or a graph that counts the number of each gradient (edge) orientation angle. This technique is commonly used for people detection, but may suffer from a fairly high false positive alarm rate, where the process incorrectly identifies doors, shelves, and other objects as people. Other pattern recognition techniques may include correlation motion detection, clustering algorithms like N-MEANS or DBSCAN, other histogram techniques like histogram of corners or color histograms, and feature extraction techniques like Canny, Sobel, FAST (Features from Accelerated Segment Test), SIFT (Scale Invariant Feature Transform), PCA-SIFT (Principal Component Analysis-SIFT), F-SIFT (fast-SIFT) and SURF (speeded up robust features).

The pattern library 516a may include a base set of alarm values (e.g. thousands, each written into software). Coherent change detection may allow for these sets of patterns to change over time based on the data that the robot collects over time. For example, a robot can learn new patterns over time. The robot may detect patterns, store them, and then use them later. For example, if the robot keeps bumping into a box (based on collecting data associated with characteristics of the box), it may determine that box is present in a certain location, or that the box is present only during certain times of day, etc., and a new pattern based on that box.

After pattern recognition analysis is completed at box 504a, the pattern recognition result may be sent, along with results from neural network box 506a and rule based expert system 508a, to fuzzy logic box 510a. An artificial neural network (ANN), or often just neural network (NN) such as nrutal network 506a, may include a set of connected nodes that approximate the operation of a nerve cell. The connected nodes may include a set of input nodes, some hidden nodes in the middle, and some output nodes. Each node may have a summation function that combines all of the inputs, and a threshold function, which determines if the node passes its information onto the next layer. ANN's may be trained rather than programmed. Each node may have a weight that is applied to each input, and may modify the summation function. The training process may modify these weights until the ANN produces close to the desired output. The ANN may also make mistakes, and may have a consistent false alarm rate.

Expert Systems, such as for example rule based expert system module 508a, may include any sort of logic tree that can be used to classify alarms. For the example described above where a robot determines that a person is present in the environment, expert system 508a may examine sensor signatures for volume, height, width, and speed to see if they fit within human parameters. For example, the rule based expert system may determine that since an object is over ten fee tall as determined by the data collected about that object, the object is not a person because a rule says that people cannot be more than eight feet tall. In one example, an expert system may include "non-procedural programming language", where the computer is given a set of instructions but not the order in which they are to be executed. The computer software may then use a tree-search algorithm to determine which order in which the instructions are to be completed. Expert systems may combine and analyze data, which may include possibly conflicting characteristics, to determine a solution.

The one or more detection or classification modules, or signature detection stages, may each yield an output that includes three different numbers: belief, confidence, and certainty. Belief is whether or not the process returned a positive result, and is either an alarm level or not. Confidence is the degree to which the signature that was detected matches the signature(s) in the database. For example, confidence can be expressed as a probability from 0 to 1. The certainty is the degree to which the computer believes the sensor can be trusted to detect this particular signature at this particular range. Certainty may be developed out of a computer model of the sensor's capability that returns a number from 0 to 1 that shows how reliable a sensor is at detecting this signature over the range and field of view of the sensor. As an example, LIDAR sensors may get an increasing amount of noise as the range increases, and are less reliable about detecting motion the farther away the object gets.

Fuzzy logic module 510a may receive the sets of data from each of the detection or classification modules. For example, module 510a may use set theory to combine the data. Module 510a may be configured to determine to what degree the patterns detected fit into the set of the things that would determine that the event has occurred (e.g., causing an alarm). In other words, rather than answering the question "is this number bigger than that one" or "is the value true or false", it determines "to what degree does this information match with the set of similar objects". For example, the patterns detected may be compared to the set of rules or patterns that would cause an alarm to be positive or correct. A result from box 510a may include a percentage of certainty that the data fits each of one or more patterns. For example, each pattern or belief result may include two outputs: (1) a certainty that the pattern is met, and (2) a degree of confidence in that certainty. This determination may be made based on several factors. For example, the robot may include algorithms directed to models of each sensor, process and result. More specifically, a model of a certain sensor may know the characteristics of the sensor to determine how to weight (e.g. credit or discredit/discount) data that came from it. Each sensor may have a different model that represents it. In other words, the model may show how well the sensor can be trusted based on the circumstances around the data that was collected from it. For example, if a 3D camera has a range of sixty feet and it collected data from fifty feet away, then the data may be discounted since the data was captured at close to the end of the sensor's range.

A similar process may be implemented on the other side of block diagram 500. While the positive detection subsystem is trying to prove the premise that "this signature matches an alarm", the negative detection is trying to prove that the signature matches a false alarm. While the positive side has a database of alarm signatures, the negative side has a database of false alarm signatures, or things that have caused false alarms in the past. For example, data from box 502 and patterns from pattern library 516b may be analyzed at box 504b for pattern recognition, and results from pattern recognition box 504b along with neural network 506b and 508b may be fed into fuzzy logic box 510b. Patterns at box 516b (negative false alarm detection) may be different (either all or in part) than the patterns at box 516a (positive false alarm detection) because they are patterns that lead to a decision of no false alarm being generated. The result from box 510b may be fed into the sensor fusion block 512.

Although the pattern "recognition" or "matching" process compares patterns to the current data to determine belief, confidence, and certainty values, the process does not require an exact match. Instead, the system picks the pattern that has the closest fit to the detected pattern. Having multiple methods allows the device to fit different evidence to detecting and discriminating the pattern where an exact match is not possible.

After a result is determined at fuzzy logic boxes 510a and 510b, the results are sent to a sensor fusion algorithm box 512. For example, Dempster Schafer sensor fusion may be used. Dempster Schafer is a generalization of Baysean logic (or Bayes Rule) of probability combinations that takes in account ignorance, and allows a range of results including that not enough evidence has been collected to make a decision. The final result is expressed as a degree of "premise is proved", the degree to which the "premise is disproved", a value of "not enough information is available to make a decision". The theory may also give a measure of confidence or correlation, which is the degree to which the final result has to be normalized, or made to total to 1. A high correlation or low confidence number indicates that the parts that made up the decision did not agree, and that the software is not confident in its conclusion. More specific to this example, module 512 may be configured to combine multiple uncertainties that have different bases (such as different patterns and confidence values) to come to a conclusion. Box 512 produces a result, which may include one of three outcomes: (1) yes, alarm; (2) no, no alarm; or (3) unknown, not enough information to decide. The result may also include a certainty decision that may represent the certainty with which the algorithm was certain in its determination of the result.

At box 514, a decision may be made whether or not the decision made in box 512 is correct and classified accordingly. For example, this decision may be made by a user of the system. The user may compare the decision of sensor fusion to whether or not an alarm should or should not have been generated for the given situation. The decision by the sensor fusion box 512 may be classified accordingly. For example, if box 512 determined that an alarm should have been generated, but the alarm was determined by the user to not be necessary, then the alarm would be classified as incorrect. Thresholds can be set on what level of certainty and confidence are necessary in order for the software to set an alarm condition, or the thresholds may be set dynamically using historical data.

Based on the classification of the decision made by the robot at box 514, the data (decision made by sensor fusion box 512 and the alarm classification at box 514) is transmitted to either pattern library 516a or 516b based on whether the classification determined that the sensor fusion determination was correct or not. This process of designating correct or incorrect may be completed by a user that inputs data into the system, or automatically by the system. If correct, the data (e.g. the decision and the data, or characteristics, used to make that decision) may be transmitted to library 516a; if incorrect, the data may be transmitted to library 516b. The data being transmitted from the alarm classification module 514 to pattern libraries 516a and 516b may be mutually exclusive of each other because a subset of data may not yield both a positive result (i.e. yes, should have been an alarm because the problem event was detected) and a negative result (i.e. no, should not have been an alarm because the problem event was not detected).

That data may then be used to re-weight the data that was used in the original decision (e.g. the data that was inputted into pattern recognition blocks 504a and 504b) to instruct future decisions. In other words, the combination of the decision and the data (e.g. characteristics) used to make the decision may be used as a new pattern for storage in pattern library 516a and for use by pattern recognition module 504a. In other words, Although this new data may not provide a strict "yes" or "no" conclusion in future iterations, it may inform future decisions of similar historical decisions that were made in the past so that a more informed (and hopefully more accurate) decision can be made and to avoid future false alarms. In other words, the robot knows what data/formula it used to come to its conclusion, and it can tweak the data/formula next time based on the conclusion and the correct or incorrect classification. Over time, the robot gets smarter and smarter, and user/human intervention may no longer be necessary. Furthermore, the pattern libraries and decision data may be transmitted and stored at other robots in the same environment so that the group of robots may learn as a group.

Figure 6:
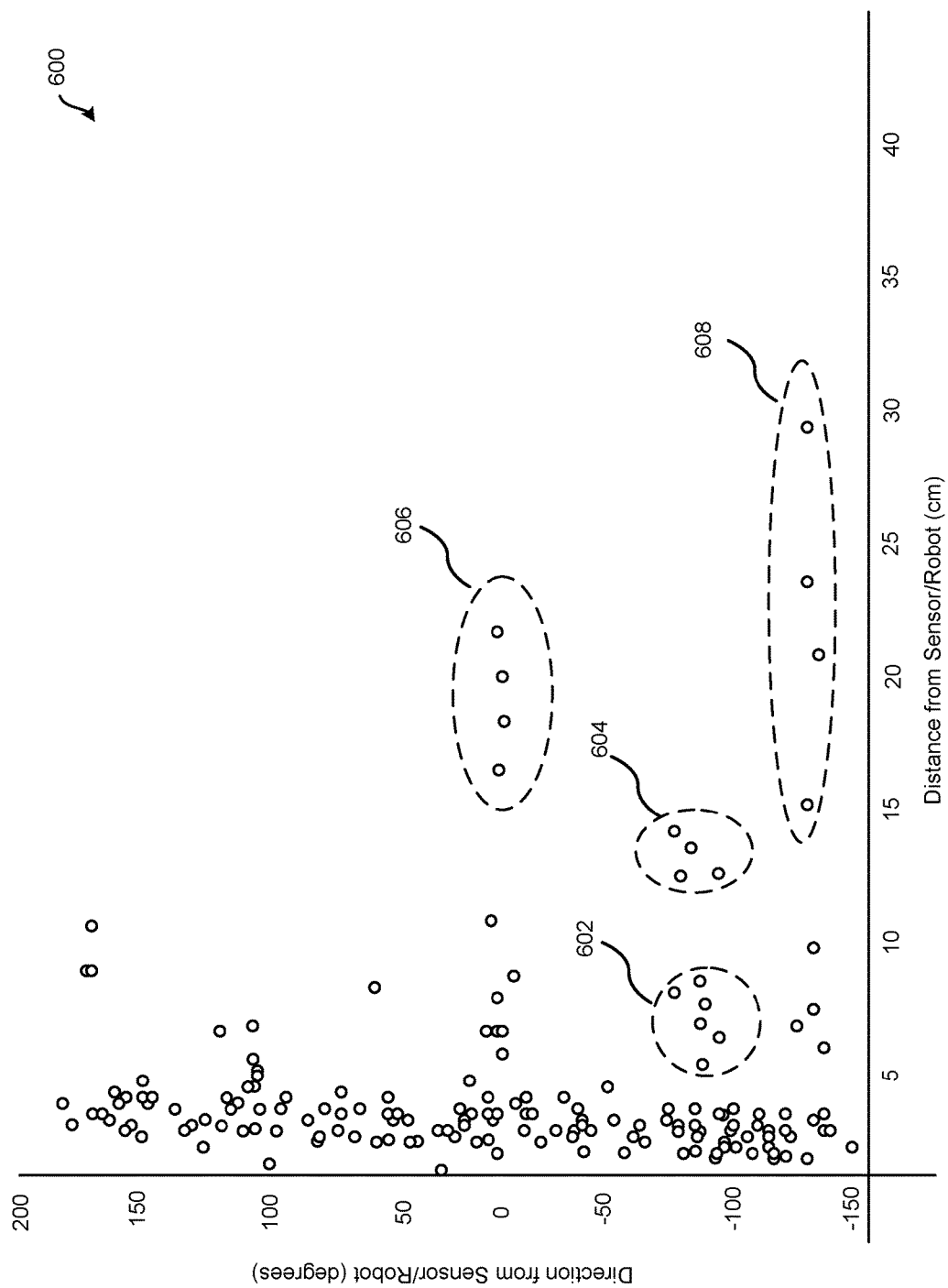
FIG. 6 illustrates a graph that shows a plot of data captured at a sensor, such as a LIDAR sensor, associated with a moving person, according to embodiments of the present technology.

FIG. 6 illustrates a graph that shows a plot of data captured at a sensor, such as a LIDAR sensor, associated with a moving person, according to embodiments of the present technology. The x-axis of the plot represents distance from the sensor in centimeters and the y-axis of the plot represents the direction or angle from the sensor in degrees. Each point on the plot represents a detected portion of an object (e.g. an arm, a whole person, a box, etc.) and its distance and direction/angle from the sensor. Some of the points may represent data collected at different times by the sensor. For example, a sensor may collect data every fraction of a second, and therefore the data represented on plot 600 may include data associated with the same object at different times. Points in the plot that are grouped together may represent, for example, a detected person. For example, the points in blob 606 may represent a person walking because the data points collected an object at a different distance away from the sensor but at a similar angle from the sensor. However, as noted herein, detected data may also represent false positives. For example, most of the points along the y-axis of the plot represent noise, and do not indicate that a person is present. One example of noise is included in point blobs 602 and 604. On the other hand, point blob 606 represents a person. Another example false positive is represented by point blob 608, which represents a shadow of the person indicated by points in point blob 606.

Referring back to FIG. 5, the points in point blob 606 would be transmitted from alarm classification 514 to pattern library 516a because the points in blob 606 represent data that correctly indicated a problem event that should initiate an alarm. Data associated with the decision made by the alarm classification 514 regarding point blob 606, i.e. whether or not the points in point blob 606 were determined by the system to be a person or not, may also be transmitted with the blob data to pattern library 516a. On the other hand, if the system determined that the points in point blobs 602, 604 and 608 were representative of the problem event, then that data may be transmitted to pattern library 516b because such a determination would be a false alarm since those sets of data actually do not represent a person. As noted herein, this final determination may be validated by a user or operator in operator validation engine 518.

While the examples used herein have generally been described using people recognition and temperature recognition, various other types of recognition may also be used in conjunction with the present technology. For example, the current system may be used with data associated with images, sound, motion, temperature, among others.

Figure 7:
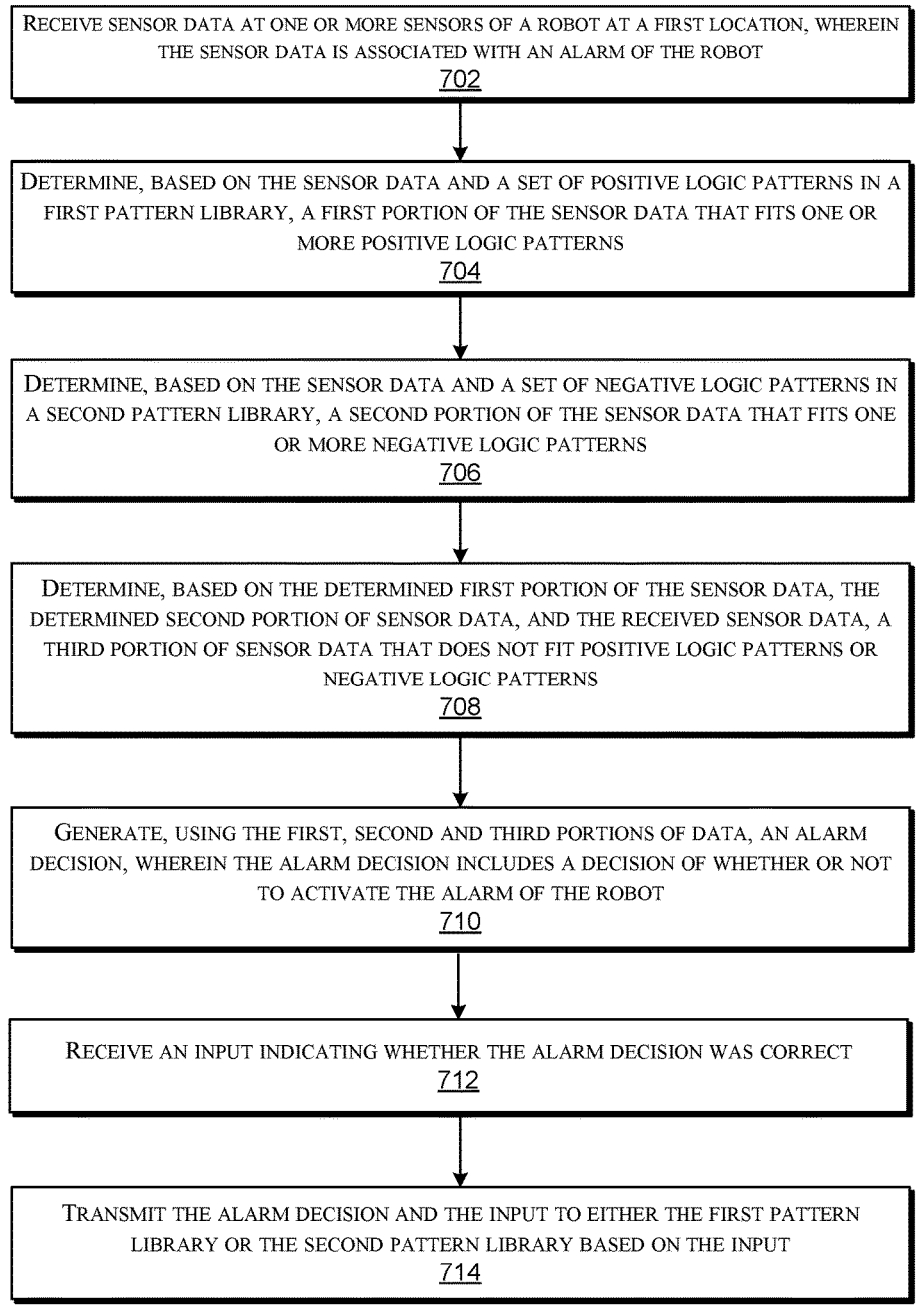
FIG. 7 shows a flow chart illustrating an example process of mapping an environment while using follow-me training techniques, according to embodiments of the present technology.

FIG. 7 shows a flow chart illustrating an example process of reducing false alarms in a robot by sensor fusion, according to embodiments of the present technology. Step 702 may include, for example, receiving sensor data at one or more sensors of a robot at a first location, wherein the sensor data is associated with an alarm of the robot. Step 704 may include, for example, determining, based on the sensor data and a set of positive logic patterns in a first pattern library, a first portion of the sensor data that fits one or more positive logic patterns. Step 706 may include, for example, determining, based on the sensor data and a set of negative logic patterns in a second pattern library, a second portion of the sensor data that fits one or more negative logic patterns. Step 708 may include, for example, determining, based on the determined first portion of the sensor data, the determined second portion of sensor data, and the received sensor data, a third portion of sensor data that does not fit positive logic patterns or negative logic patterns. Step 710 may include, for example, generating, using the first, second and third portions of data, an alarm decision, wherein the alarm decision may include, for example, a decision of whether or not to activate the alarm of the robot. Step 712 may include, for example, receiving an input indicating whether the alarm decision was correct. Step 714 may include, for example, transmitting the alarm decision and the input to either the first pattern library or the second pattern library based on the input.

Figure 8:
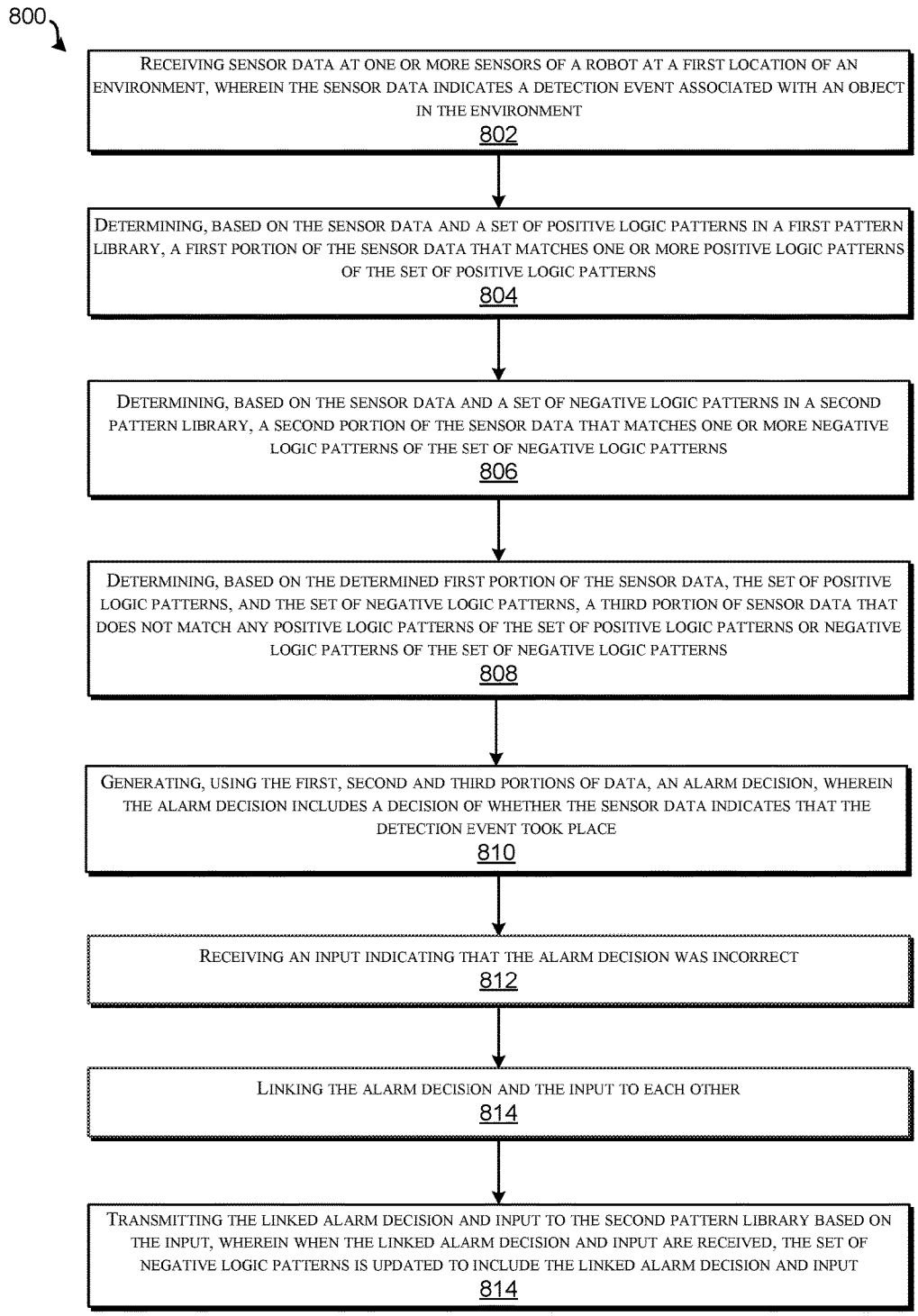
FIG. 8 shows a flow chart illustrating an example process of mapping an environment while using follow-me training techniques, according to embodiments of the present technology.

FIG. 8 shows another flow chart illustrating an example process of reducing false alarms in a robot by sensor fusion, according to embodiments of the present technology. Step 802 may include, for example, receiving sensor data at one or more sensors of a robot at a first location of an environment, wherein the sensor data indicates a detection event associated with an object in the environment. Step 804 may include, for example, determining, based on the sensor data and a set of positive logic patterns in a first pattern library, a first portion of the sensor data that matches one or more positive logic patterns of the set of positive logic patterns. Step 806 may include, for example, determining, based on the sensor data and a set of negative logic patterns in a second pattern library, a second portion of the sensor data that matches one or more negative logic patterns of the set of negative logic patterns. Step 808 may include, for example, determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns. Step 810 may include, for example, generating, using the first, second and third portions of data, an alarm decision, wherein the alarm decision may include, for example, a decision of whether the sensor data indicates that the detection event took place. Step 812 may include, for example, receiving an input indicating that the alarm decision was incorrect. Step 814 may include, for example, linking the alarm decision and the input to each other. Step 816 may include, for example, transmitting the linked alarm decision and input to the second pattern library based on the input, wherein when the linked alarm decision and input are received, the set of negative logic patterns is updated to include the linked alarm decision and input.

Department stores or other businesses that require large warehouses to store goods may require inventory to be taken on those goods. These businesses may use employees with radio-frequency identification (RFID) readers to walk around and scan each item in the warehouse one-by-one, or may use fixed infrastructure including RFID readers attached to the ceiling or elsewhere to continuously capture RFID tags on the goods. However, these methods may be expensive and inefficient due to the cost of labor and RFID readers. Furthermore, the RFID readers in these situations cannot localize the RFID tags, and instead can only determine if the RFID tag is present or not (and develop, for example, only a list of RFIDs that are present in the range of the antenna). Instead, a robotic device may be used for inventory.

Figure 9B:
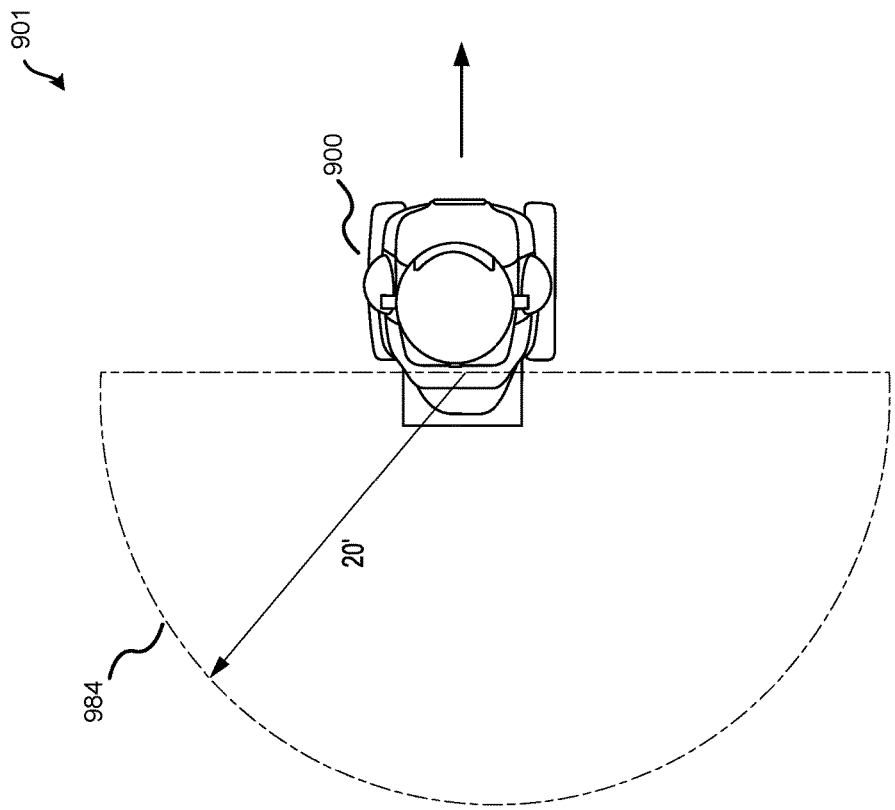
FIGS. 9A and 9B shows a robot 500 with an antenna 582 to communicate with items, according to embodiments of the present technology
Figure 9A:
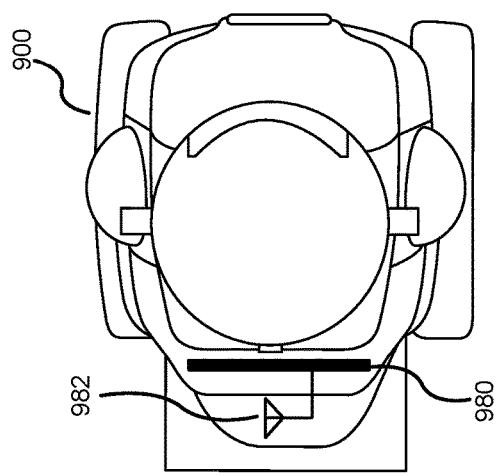

FIGS. 9A and 9B shows a robot 900 in environment 901 with an antenna 982 to communicate with items, according to embodiments of the present technology. Antenna 981 may be omnidirectional, or robot 900 may include an antenna on each side of the robot, each of which covers 180 degrees. Robot 900 may include an antenna 982 located flat on the back of the robot 900. The antenna 982 may be connected to robot 900 via a communication blocking mechanism 980, such as a metal plate or other mechanism that blocks communication from antenna 982 to other devices (e.g. RFID tags) in certain directions. For example, as shown in FIG. 9B, the antenna 982 of robot 900 may have a field of communication that looks like field of communication 984, or in other words a field that includes 180 degrees directly behind robot 900. Such a field of communication may exist because blocking mechanism 980 blocks communication (e.g. body nulling) between antenna 982 and other devices in the other 180 degrees of field towards the front of the robot. The field of communication may be set to any of a variety of distances (e.g. 20 feet, as shown in FIG. 9B). This mobile sensor platform may be used to localize non-directional RFID tags in an indoor environment.

Figure 10:
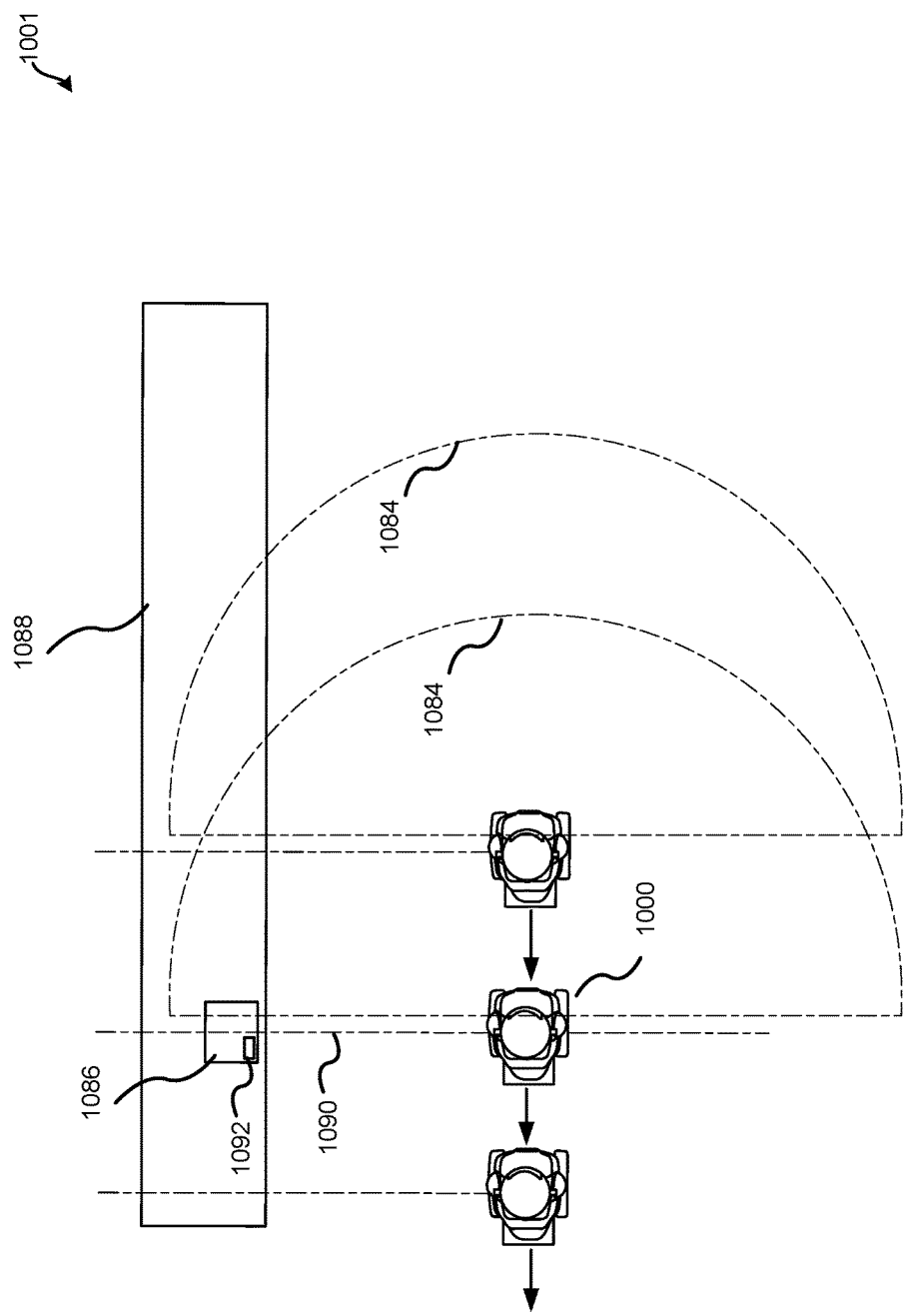
FIG. 10 shows the path of a robot 500 in an environment 601 where the robot may be used to take inventory, according to embodiments of the present technology.

FIG. 10 shows the path of a robot 900 in an environment 1001 where the robot may be used to take inventory, according to embodiments of the present technology. Because of the field of communication 1084 of robot 1000, the antenna of robot 1000 may not be able to "see" or communicate with an item 1086, for example, on shelving 1088. The RFID reader connected to the robot using the antenna may transmit continuous or periodic pulses that detect RFID tags, which may allow the robot to determine the RFID tag's, and therefore the object's, presence. However, robot 1000 may move over time and pass by item 1086 such that item 1086 may come into the field of communication of robot 1000. Since the physical location of the antenna to the communication blocking mechanism (for example, the location of antenna 982 to blocking mechanism 980 in FIG. 9A) can be predetermined, it can be calculated or otherwise determined the exact (or close to exact) orientation (e.g. angle) at which the antenna on robot 1000 can begin to view or communicate with an item (or an RFID tag on the item). For example, the field of communication of robot 1000 may begin at a 90 degree angle directly next to robot 1000 as shown in FIG. 10. In other words, robot 1000 may first be able to communicate with item 1086 when item 1086 is at a 90 degree angle (or another known angle) from the path of robot 1000 (for example, when the robot's line of sight/communication overlaps with line of sight 1090. Robot 1000 may record and/or store when an RFID tag (e.g. the RFID tag 1092 on item 1086) is first detected by the antenna (including, for example, an RFID reading technology) on robot 1000. For example, the robot may record its location at the moment that the robot senses, communicates with, or otherwise knows that the RFID tag is in its range. This should happen when robot 1000 crosses line of sight communication path 1090. Since robot 1000 and RFID reading or detecting technology may scan for new RFID tags on a periodic basis (e.g. 20 times per second, although more or fewer are also possible), the robot may record its location at multiple locations with respect to the RFID tag. Therefore, the angle at which an item was detected with respect to the robot can be localized to a fine level of specificity.

RFID tag 1092 may be a passive device, such that RFID tag 1092 does not have any active power source on a consistent basis. Instead, RFID tag 1092 may be awaken or stimulated when it comes into contact with an electric field. In order to activate the RFID tag 1092, and therefore to communicate with RFID tag 1092, the antenna on robot 1000 may generate an electric field that stimulates and awakens RFID tag 1092 so that it may communicate with the antenna.

As noted, robot 1000 may move around environment 1001. Robot 1000 may move through environment 1001 on different paths and on different angles. Therefore, the same process described above, including robot 1000 recording the location of an item such as item 1086 using RFID tag 1092, may be performed multiple instances over time. For example, as noted, the robot may record its own location (coordinates, for example) each time it sees a particular tag. Multiple recordings of location, each at the same angle away from the path of robot 1000, may allow for robot 1000 to determine the exact location of item 1086 within environment 1001. These locations may be applied to a map of environment 1001 as determined over time by robot 1000.

Figure 11:
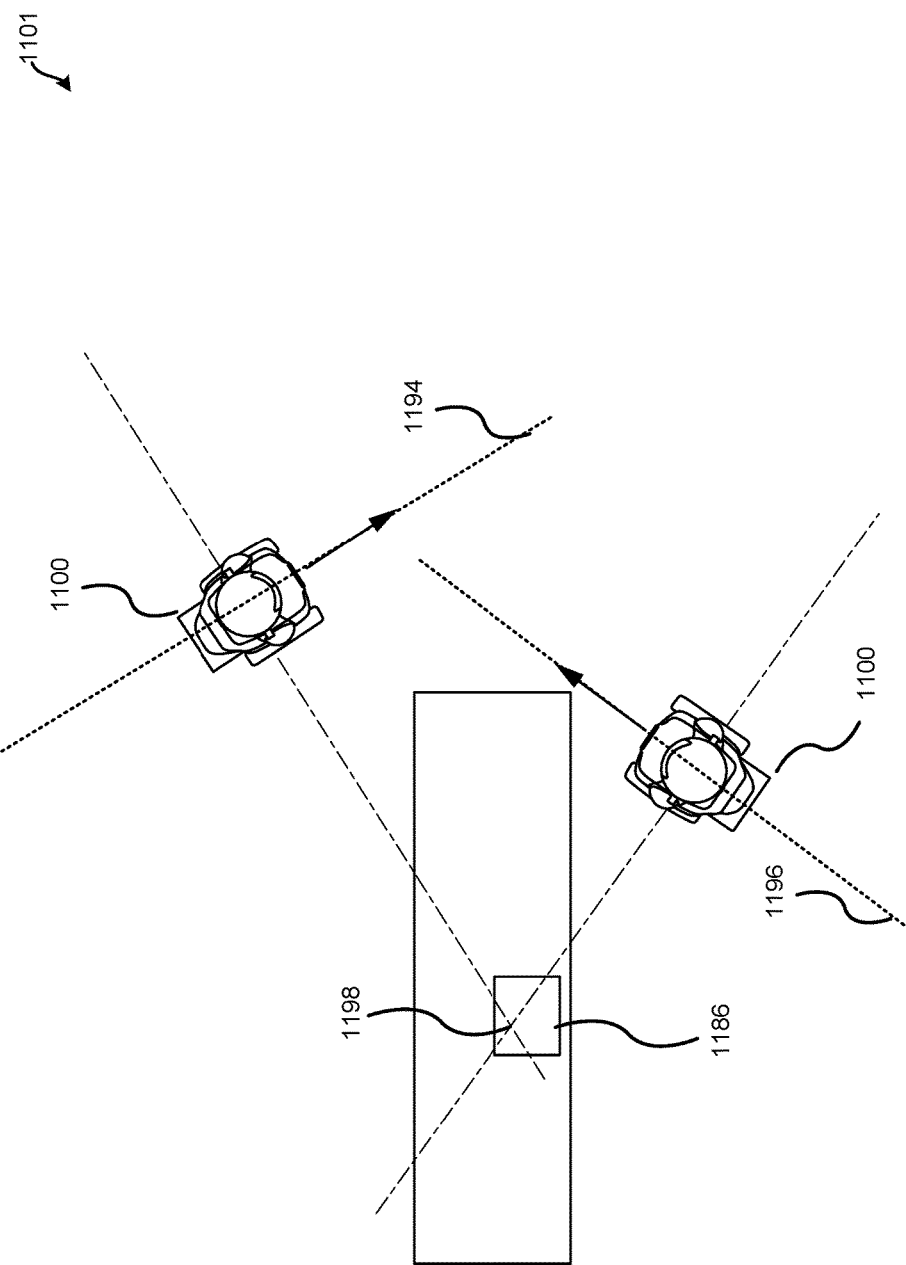
FIG. 11 illustrates a process of determining a location of robot using RFID technology, according to embodiments of the present technology

FIG. 11 illustrates a process of determining a location of robot 1100 in environment 1101 using RFID technology, according to embodiments of the present technology. As noted, multiple passes by robot 1100 by item 1186 may allow robot 1100 to collect multiple location data points for item 1186. In a first pass, robot 1100 may travel along path 1194. Because the field of communication of robot 1100 along path 1194 is a 180 degree view directly behind the robot, the antenna of robot 1100 may first communicate with the RFID tag on item 1186 when robot 1100 is directly next to, at a 90 degree angle, item 1186. In other words, when robot 1100 first detects item 1186 (i.e. when robot 1100 can first communicate with the RFID tag on item 1186), the robot 1100 may determine its location and orientation, and then determine that item 1186 is on a plane that is at a specific angle (e.g. 90 degrees) off its path 1194. Robot 1100 may then repeat this process when it is on a different path, such as path 1196. Using detected location data from both paths, robot 1100 may localize item 1186 at a location that is at point 1198 (e.g. using triangulation techniques), where the paths intersect or converge. The robot may know its own location (using GPS or other techniques) at all times. The robot may use a map of the room and location of robot with respect to the item scanned to determine location of items and store them for inventory. Robot 1100 may also record other data associated with item 1186 and location, such as the time that the reading/detection was taken when it passed item 1186, the location of robot 1100 when it took the reading, and other data.

To improve the accuracy of the determination of the location of object 1186, the robot may collect its location (and orientation) with respect to the object more than two times. For example, if the robot were to collect its location information three times, then lines associated with its paths on all three instances should converge on the same point, such as point 1198. If the three points do not converge at the same point, then one or more of the sets of location information may be incorrect. In such a situation, the robot may continue to collect location information with respect to the object until the robot has collected enough data associated with its location with respect to the object that the robot is confident, based on an internal calculation, that it knows the object's location. For example, a predetermined (or dynamically changing) threshold may be set for the robot. More specifically, the robot may only be satisfied that it has determined the location of the object after it has obtained data associated with a certain number or percentage of paths (i.e. lines associated with its paths, as shown in FIG. 11) that converge at the same or substantially the same point. A predetermined (or dynamically changing) threshold may also be set for the proximity of the paths/lines to each other for the robot to determine that the paths/lines converge at a particular point (or proximity of points). Furthermore, the two dynamically changing thresholds described above may be dynamically changing using data collected over time by the robot based on how often the robot correctly determines the location of the object. For example, using the reducing false alarms system described herein, the robot may dynamically determine the thresholds based on feeding correct and incorrect decision data back into its own decision making process.

To determine when robot 1100 (or the antenna and RFID reader on robot 1100) has detected a new RFID tag (or new item), it may scan (at a rate, for example, of 20 times per second) for RFID tags within its range, and may generate a list of RFID tags (and/or associated items) that it identified. Robot 1100 may then compare that list to a previously generated list (e.g. from $1/20^{th}$ of a second before) to determine which new RFID tags have been detected.

Robot 1100 may also be able to choose a path that maximizes the ability of the robot to triangulate location of an item. For example, if robot 1100 has already traveled along path 1194 and gathered location data associated with item 1186, and path 1196 is the ideal path for robot 1100 to take in order to triangulate the location of item 1186, robot 1100 can choose to travel along path 1196 to maximize efficiency with localization. The ideal path may be determined by robot 1100 based on the previous path(s) taken. For example, an ideal path may be as close to 90 degrees from the previous path as possible. In another example, a robot may purposefully use a predetermined alternative path, such as a zig-zag type path in order to obtain better angles with respect to RFID tags it is trying to communicate with. The robot may also be programmed to use other types of paths, which allow the robot to obtain the data it needs. For example, the robot may incorporate a fishtail type path.

Localizing items for purposes of inventory and mapping may save resources in paying employees, buying many RFID readers for an environment (either manually or in a fixed infrastructure), among others. Although the RFID robot technology described herein is described with respect to an example associated with a warehouse, this technology may be used for a robotic device locating any item with which the robotic device is communicating via RFID.

Figure 12:
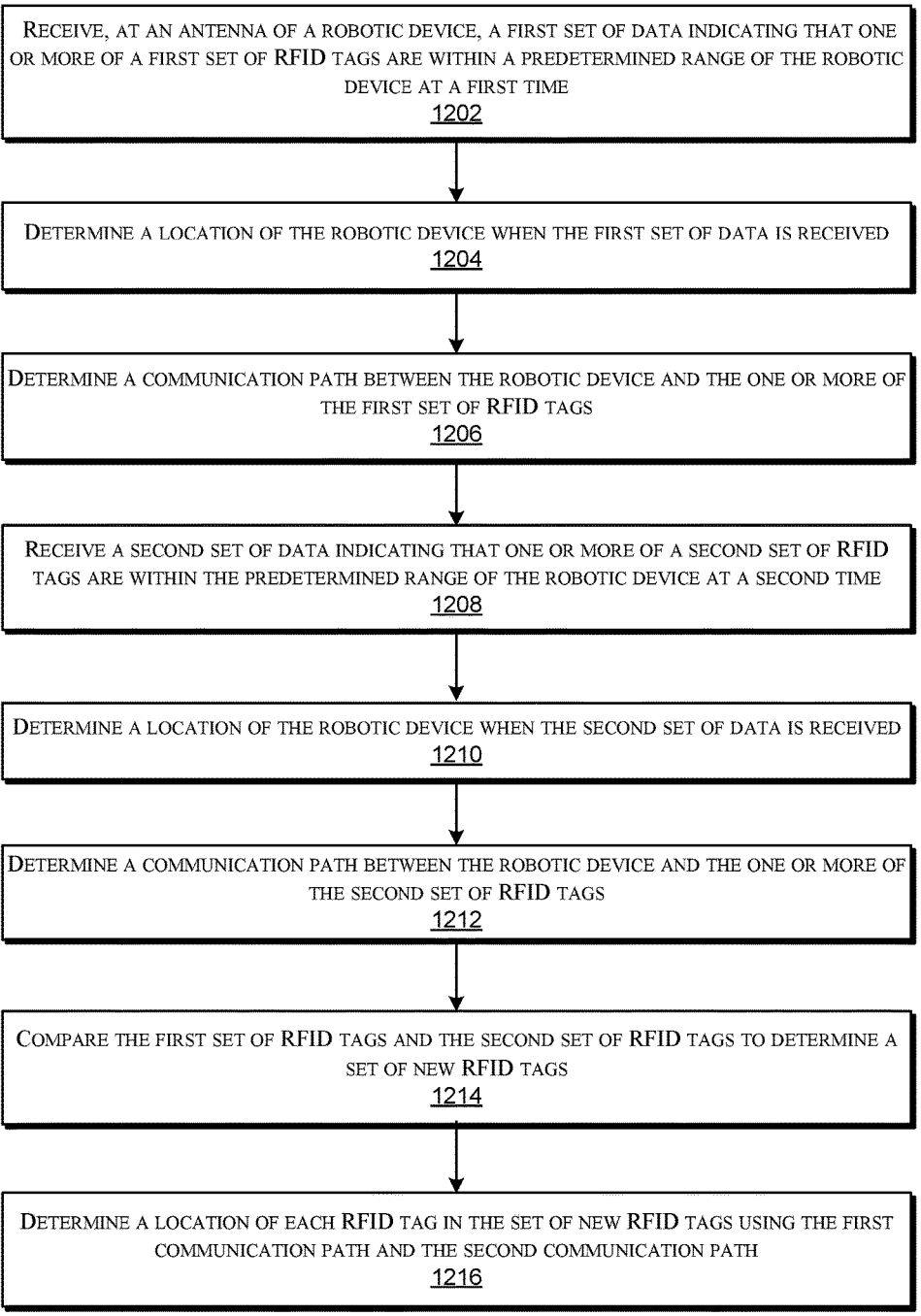
FIG. 12 illustrates an flow chart including an example process of determining a location of robot using RFID technology, according to embodiments of the present technology.

FIG. 12 shows a flow chart illustrating an example process of determining a location of a robot using RFID technology, according to embodiments of the present technology. Step 1202 may include, for example, receiving, at an antenna of a robotic device, a first set of data indicating that one or more of a first set of RFID tags are within a predetermined range of the robotic device at a first time. Step 1204 may include, for example, determining a location of the robotic device when the first set of data is received. Step 1206 may include, for example, determining a communication path between the robotic device and the one or more of the first set of RFID tags. Step 1208 may include, for example, receiving a second set of data indicating that one or more of a second set of RFID tags are within the predetermined range of the robotic device at a second time. Step 1210 may include, for example, determining a location of the robotic device when the second set of data is received. Step 1212 may include, for example, determining a communication path between the robotic device and the one or more of the second set of RFID tags. Step 1214 may include, for example, comparing the first set of RFID tags and the second set of RFID tags to determine a set of new RFID tags. Step 1216 may include, for example, determining a location of each RFID tag in the set of new RFID tags using the first communication path and the second communication path.

According to embodiments of the present technology, sensors on a robot may assist robot in following a person (e.g. a trainer) during a "training" of the robot. In other words, a person may lead the robot around an environment so that the robot may collect data about the environment to learn about how to move around the environment, to map the environment, and to share with other robots. For example, a LiDAR sensor may direct the robot's attention to the trainer, the thermal camera may keep the robot within a certain predetermined distance of the trainer, and a 3D camera may confirm at periodic times that the person the robot is following is the correct person. In another embodiment, the trainer may wear a distinguishing feature on his body (e.g. color cap, smartphone, patch, etc.) so that the robot may identify the trainer. For example, the trainer may wear an IR patch that can only be seen by an IR camera, such as the one included in the robot.

Various sensors may allow for the robot to follow a person during training. First, a LiDAR sensor may allow the robot to, for example, identify that a person is within a certain range of the robot, and then determine a distance and angle at which a person, such as a trainer, may be located. For example, the LiDAR may collect data that may allow the robot to determine that the person's center of mass is a certain distance ahead of the robot and a certain angle off of the robot's center path line. The robot may also store in memory certain predetermined shapes or patterns that may help the robot to identify certain objects or pieces of objects (e.g. legs) associated with a person. In another example, a forward looking infrared (e.g. FLIR) thermal camera may allow the robot to keep a lock on the person once it has detected its presence. This sensor may allow the robot to determine that it is following a person (e.g. using a temperature sensor). In another example, a 3D camera sensor may allow the robot to ensure that it keeps following the same person (trainer) once it has determined that it should follow a person with certain 3D characteristics. For example, the 3D camera sensor may determine a volume of the person, which may be unique to that person. Also, similar to the LiDAR, the 3D camera sensor may collect data that may allow the robot to determine that the person's center of mass is a certain distance ahead of the robot and a certain angle off of the robot's center path line.

Figure 13:
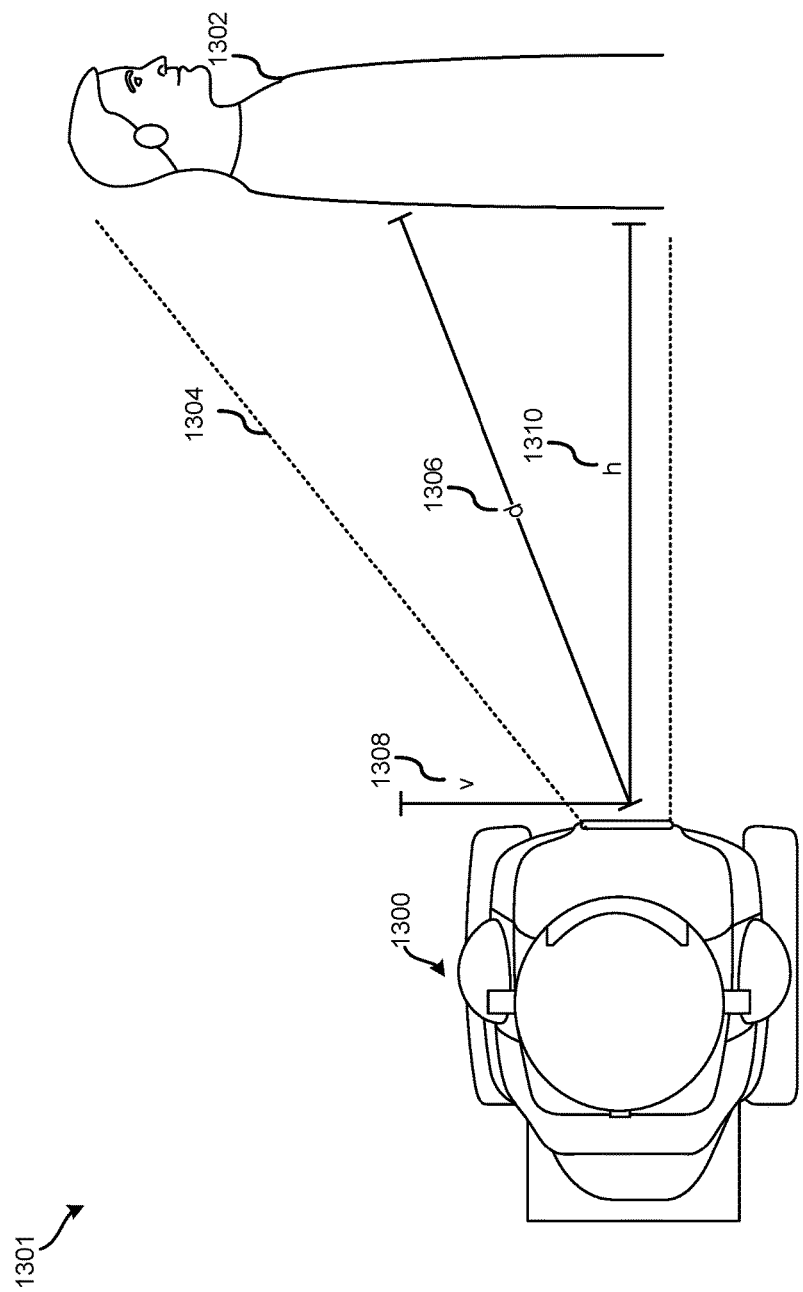
FIG. 13 shows a robot and a trainer where the robot is following the trainer during a training of the robot, according to embodiments of the present technology.

FIG. 13 shows a robot 1300 and a trainer 1302 where the robot is following the trainer, such as trainer 1302, during a training of the robot in environment 1301, according to embodiments of the present technology. For example, sensors that are a part of robot 1300 may compile data associated with the trainer 1302. For example, sensors may compile data such as distance data of the person 1302 showing how far person 1302 is away from robot 1300. For example, sensors on robot 1300 may determine a horizontal distance 1310 from robot 1300 to person 1302 and/or a vertical distance 1308 from robot 1300 to person 1302, which may allow the robot to determine or calculate distance 1306 between robot 1300 (or the sensor on robot 1300) to person 1302. More specifically, when sensors determine distances 1306, 1308 and 1310 (or other distances) from the robot, the sensors may determine the distances from the sensor itself, from the center of mass of the robot, from the front of the robot, from the back of the robot, among other options. When sensors determine the distances to the person 1302, the sensors may determine the distances to the center of mass of the person 1302, to the nearest point on the person 1302, among other options.

The first step in a follow-me technique for training robot 1300 may include the robot recognizing that a person is standing in front of it. More specifically, the robot 1300 may be placed in a mode where the robot scans or otherwise looks for a person, such as person 1302, which is going to train the robot. For example, the robot may be placed in a "training" or other mode type that designates the robot as beginning a training. During this mode, robot 1300 may use its sensors to determine if a person (e.g. a trainer) is within a certain distance or range of distances, and if so, may determine that that person is its trainer. For example, the robot may determine that a person is its trainer if it is located within certain distance threshold(s) of the robot (e.g. horizontal and vertical distances). To place the robot in training mode, the trainer or another user may push a button on an application on a mobile device connected to robot 1300, may push a button on the robot itself, among other possibilities.

After robot 1300 has determined that a person/trainer is in the requisite range of the robot, then the robot may "lock in"

or otherwise target the person as its trainer, which the robot will follow during the training. More specifically, the robot may target the person such that when the person moves, the robot moves with the person. The robot may follow the person at the person's speed, in the person's direction, etc. When robot 1300 has targeted a person as its trainer, one or more of its sensors may be locked into the person to track the person's movements and data (e.g. location) resulting from those movements. In other embodiments, person 602 may wear a distinguishing feature (e.g. smartphone, patch—such as IR patch, such as one that can only be seen by IR camera—clip-on, etc.) such as a particular color clothing, that the robot could follow.

Robot 1300 may measure/determine person 1302's location (with respect to the robot or otherwise) and other data on a periodic basis (e.g. 20 times per second) and it may record or store this data each time it determines it. For example, the sensors on robot 1300 may determine the person's volume, width, height, mass, color skin, clothing, etc. that may distinguish the person from other people. Therefore, if another person walks in between or otherwise interrupts the path between robot 1300 and person 1302, robot 1300 will continue to target person 1302.

If robot 1300 determines that it is too far away from its trainer, person 1302, then it may transmit an alarm or other notification to person 1302 so that person 1302 may move closer to robot 1300 again. For example, robot 1300 may determine that its distance from person 1302, such as distance 1306, is greater than a certain predetermined threshold distance, and may transmit a notification any time the threshold is exceeded. In other embodiments, robot 1300 may only transmit a notification if person 1302 is at a distance greater than the distance threshold for at least a certain predetermined amount of time.

Figure 14:
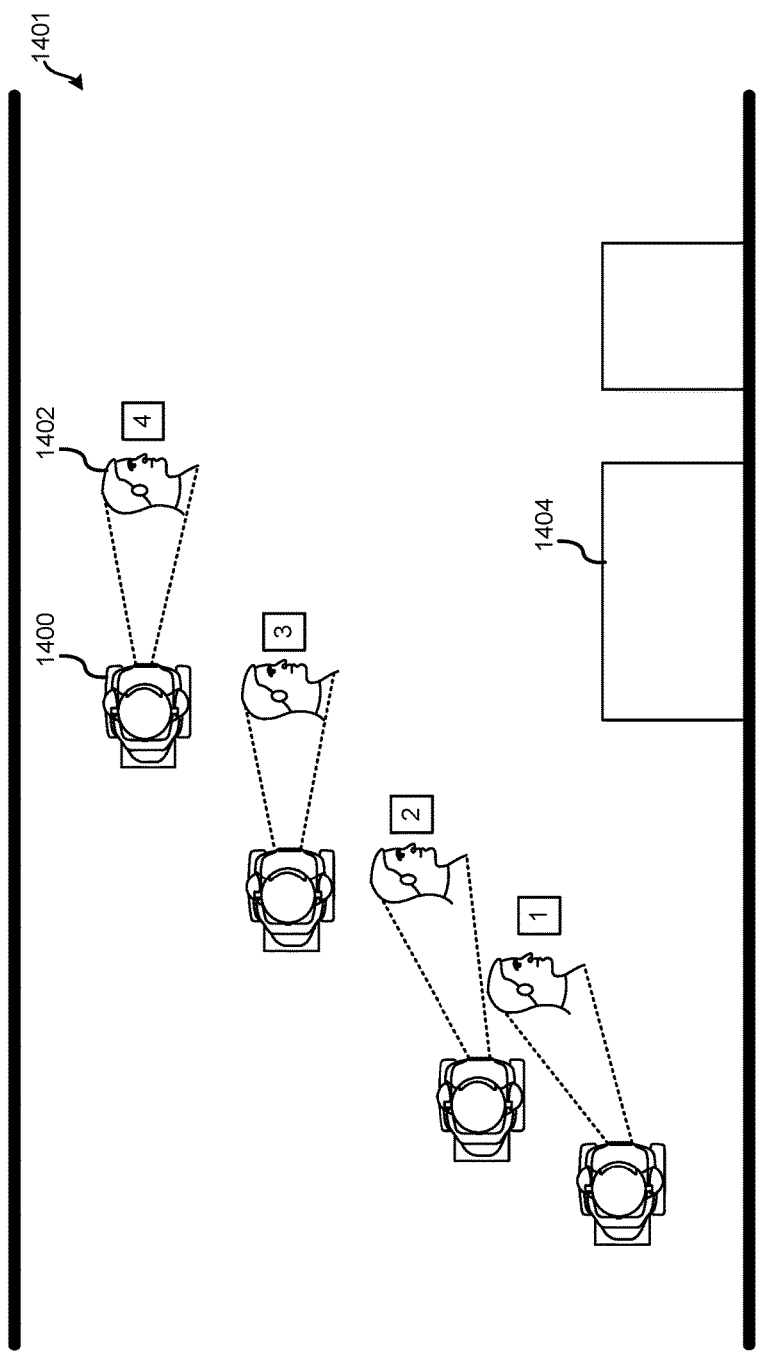
FIG. 14 shows a robot and a trainer where the robot is following the trainer along a path during a training of the robot, according to embodiments of the present technology.

FIG. 14 shows a robot 1400 and a trainer 1402 where the robot is following the trainer along a path during a training of the robot, according to embodiments of the present technology. A person 1402 may, while training robot 1400, move in various different directions throughout an environment, such as environment 1400. For example, person 1402 may move to avoid an obstacle, such as obstacle 1404. In other examples, person 1402 may move in the normal path of the person's movement, or for other reasons. Robot 1400 may be configured to follow person 1402 on a pursuit curve or route (e.g. lead pursuit, lag pursuit, pure pursuit, etc.). More specifically, robot 1400 may move in a direction that is always facing person 1402. When person 1402 moves in a certain direction at a certain speed, robot 1400 may be configured to turn in that direction and/or change to that same speed so that robot 1400 may continue to follow person 1402 while facing person 1402. In another example, when person 1402 moves, robot 1400 may move with person 1402 so that robot 1400 is always within a certain predetermined distance of person 1402. Other rules for following may also exist. For example, robot 1400 may always move so that the center path line of robot 1400 is always in line with the center path line of person 1402.

To follow person 1402, robot 1400 may perform one of a variety of different processes. For example, robot 1400 may measure the location of person 1402 with respect to robot 1400 (e.g. by their centers of mass) on a periodic basis. For example, robot 1400 may measure the location of person 1402 every 5 milliseconds. For each consecutive determination of location of person 1402, robot 1400 may adjust its path so that it may move with person 1402. For example, robot 1400 may turn in a certain direction, change its speed, etc.

As shown in FIG. 14, robot 1400 follows person 1402 from position 1 to position 4. At position 1, robot 1400 is offset from person 1402. As person 1402 moves to position 2, robot 1400 follows person 1402 so that robot 1400 is a similar distance away from person 1402, and is moving closer to the center movement path line of person 1402. At position 3, robot 1400 is no longer offset from person 1402's movement path line, and is directly behind person 1402. In other words, robot 1400 may be configured to follow person 1402 based on a predetermined set of rules so that robot 1400 may collect data about environment 1401 and objects, both permanent and temporary, in the environment. This collected data may be used to create one or more maps of environment 1401.

While the robot follows the trainer along the trainer's path or route, the robot may periodically determine and record/save its immediate location over a period of time. The robot may then store periodic locations over a period of time so that the robot saves the path or route of the trainer based on those recorded locations. Such locations may allow the robot to repeat that recorded route at a later time. For example, the robot may load the first location in the route and then move to that location, and then load subsequent locations and one-by-one move to those locations, allowing for the robot to follow the previously recorded route.

After a route has been generated/established, the route may be stored at the robot for future use. For example, the robot may have a stored schedule (either predetermined or dynamically determined over time) for routes it has stored. For example, the robot may switch off running certain routes, or may have a specific schedule of when to perform certain routes. The schedule may be based on time of day, day of the week, time of year, type of user or company using the robot, among a variety of other factors.

Figure 15:
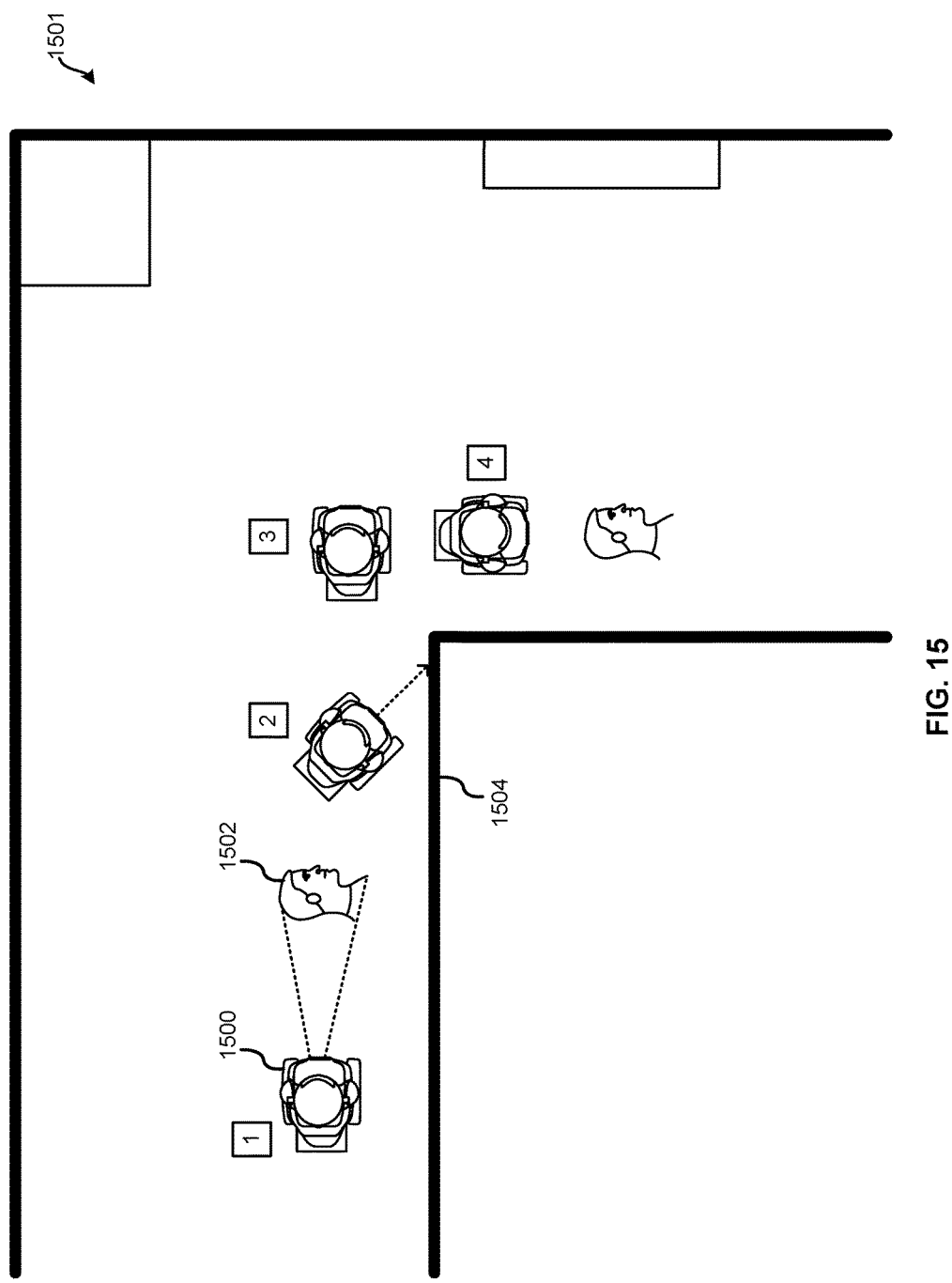
FIG. 15 shows a robot and a trainer where the robot is following the trainer along a path around a corner during a training of the robot, according to embodiments of the present technology.

FIG. 15 shows a robot 1500 and a trainer 1502 where the robot is following the trainer along a path around a corner during a training of the robot, according to embodiments of the present technology. One exception where it may not be desirable for robot 1500 to directly follow person/trainer 1502 is if person 1502 turns a corner. As shown in FIG. 15, if person 1502 turns a corner, robot 1500 may move from position 1 to position 2. However, while position 2 faces person 1502 (and may be the result of robot 1500 following the same movement path (or one parallel to it) as person 1502, position 2 may also cause robot 1500 to run into an obstacle, such as wall 1504.

When robot 1500 detects that the path of person 1502 may cause robot 1500 to run into an obstacle, such as wall 1504, robot 1500 may change its mode from using a pure pursuit curve to a different mode. More specifically, robot 1500 may cease moving directly towards person 1502 at all times to using a breadcrumb-type mode where robot 1500 follows the exact or similar movement path to user 1502. In other words, instead of moving directly towards person 1502, robot 1500 may take an indirect route to follow person 1502 so that robot 1500 does not run into an obstacle. Such a mode may include robot 1500 using data it collects while person 1502 is moving, including the location of person 1502, to determine where it should move next. For example, it may capture data at a "breadcrumb" location of person 1502 and store that data. Then, robot 1500 may follow the line of breadcrumb locations to follow person 1502. As shown in FIG. 15, robot 1500 may use this mode to move from position 1 to position 3 to position 4 so that robot 1500 is still following person 1502 without coming into contact with wall 1504.

The process for robot 1500 to avoid hitting an obstacle, such as a wall, when person 1502 turns a corner, may include: receiving data, analyzing the data to determine that the person is turning a corner, analyzing the data to determine that an obstacle is in the way of the robot, switching from pursuit mode to breadcrumb mode, identify a time when the person's turn began, identifying a location of the person at that identified time, move to that location, move to the next location over and over until the robot has turned the corner, and then switch back to pursuit mode.

As noted, robot 1500 may follow person 1502 because robot 1500 is in training mode, where the robot 1500 is configured to follow person 1502 in order to capture data about the environment, such as environment 1501, that the robot 1500 and person 1502 are located in. This data may be used to generate one or more maps associated with the environment 1501.

In order to capture the requisite data for generating the map, data may be collected about the environment including objects in the environment. Sensors within robot 1500 may generate a point cloud, which may include various points in 3D space that are each associated with an object (either hardscapes or softscapes). This point cloud allows robot 1500 to identify objects in the environment, to differentiate between hardscapes and softscapes, and map those objects on a map of the environment. For example, robot 1500 may discard softscapes or objects that don't appear to be permanent in the environment when generating a map. Furthermore, robot 1500 may analyze the points in the point cloud to identify the floor or ground, and may discard those points because the floor may not be necessary or useful for the map. This may leave only points associated with objects sticking out of the floor (e.g. walls, etc.) that may be useful to plot on one or more maps of the environment. Robot 1500 may detect whether an object is permanent by using various analysis techniques, such as object recognition, or by comparing different perspectives of the environment over time (e.g. if the object moves over time) and by using other nearby objects.

In a next step, the robot 1500 may use object or other types of analysis techniques to determine whether the data collected by the sensors indicate that a person, such as a trainer, is located within the predetermined range of the robot for training initiation. For example, robot 1500 may analyze the data using pattern recognition to identify a human sized and shaped object. More specifically, robot 1500 may compare certain data to thresholds to determine whether or not a human is present (e.g. size, volume, etc.). Robot 1500 may also continue to run such algorithms to confirm that it is still following a person (e.g. the trainer) throughout the training session.

In a next step, robot 1500 may lock into or target person 1502. It may do so by calculating characteristics associated with the trainer, and periodically confirming that its target still fits within a range of the characteristics. Then, once robot 1500 is locked into person 1502, robot 1500 may track person 1502 to follow the movement of person 1502, and move in a similar fashion to follow person 1502.

To follow person 1502, robot 1500 may calculate the person's center of mass, determine an angle and/or distance of the person (e.g. between their respective centers of mass), and corrects its own direction and/or speed (among other characteristics) to follow the person. However, robot 1500 may follow certain rules or thresholds before adjusting its movement (e.g. speed or direction). For example, to avoid the robot moving erratically due to the trainer's erratic movements, the robot 1500 may be configured to only change its path if and when the change in direction or speed by person 1502 crosses certain predetermined thresholds.

As noted, while robot 1500 is following person 1502, robot 1500 may collect various data associated with environment 1501. This data may be used to generate one or more maps associated with the environment 1501. In order to generate such maps, robot 1500 may analyze the data to determine which data is associated with non-moving objects, and extract certain landmarks that it may use for mapping. For example, robot 1500 may use object or other types of recognition algorithms to determine if it has collected data that identifies a permanent wall in environment 1501. If so, robot 1500 may apply the wall to a map. Robot 1500 may determine any hardscapes that are present in the environment by analyzing the data, and apply them to the map automatically. On the other hand, robot 1500 may discard identified softscapes if the identified objects are determined to be mobile and/or non-permanent. For example, an object may be determined to be permanent if data is collected by the robot twenty (or a different predetermined number) amount of times over a certain period of time (and otherwise, softscapes).

Once an object is applied to a map, the object may later be removed from the map if it is determined that the object is mobile or otherwise unnecessary. For example, an object may be cleared from a map if robot 1500 collects data that indicates that the object has been removed or moved (e.g. one time, or multiple times over time). To avoid mapping mobile objects that may be still for a certain period of time while robot 1500 is standing still, the mapping feature (e.g. robot 1500 turning collected and analyzed data into data/objects on a map) may be turned off.

Robot 1500 may generate maps that are more and more accurate over time based on additional data gathered by the robot (i.e. as the robot moves around the environment additional times). Therefore, even after the robot's training is complete, the robot may continue to collect data associated with environment 1501 (even if, for example, robot 1500 is completing other tasks during that time, such as security, etc.).

As described herein, the robotic device may include three separate processes: (1) following a trainer; (2) creating a map based on following the trainer and/or collecting data from its environment; and (3) creating a route and storing that route based on following the trainer and/or the map. Embodiments including these processes may take place independently or as combinations of the processes.

Figure 16:
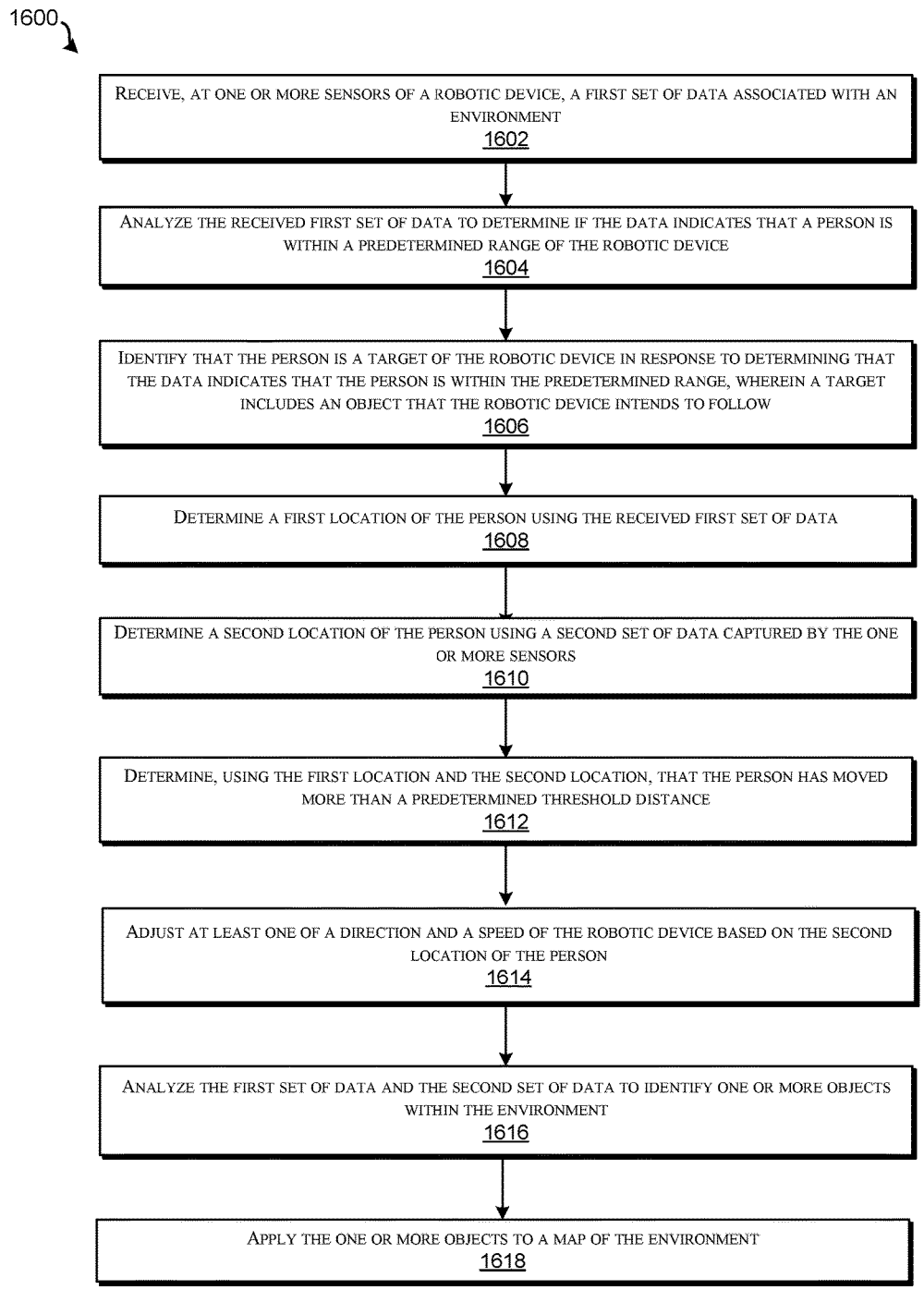
FIG. 16 shows a flow chart illustrating an example process of mapping an environment while using follow-me training techniques, according to embodiments of the present technology.

FIG. 16 shows a flow chart illustrating an example process of mapping an environment while using follow-me training techniques, according to embodiments of the present technology. Step 1602 may include, for example, receiving, at one or more sensors of a robotic device, a first set of data associated with an environment. Step 1604 may include, for example, analyzing the received first set of data to determine if the data indicates that a person is within a predetermined range of the robotic device. Step 1606 may include, for example, identifying that the person is a target of the robotic device in response to determining that the data indicates that the person is within the predetermined range, wherein a target may include, for example, an object that the robotic device intends to follow. Step 1608 may include, for example, determining a first location of the person using the received first set of data. Step 1610 may include, for example, determining a second location of the person using a second set of data captured by the one or more sensors. Step 1612 may include, for example, determining, using the first location and the second location, that the person has moved more than a predetermined threshold distance. Step 1614 may include, for example, adjusting at least one of a direction and a speed of the robotic device based on the second location of the person. Step 1616 may include, for example, analyzing the first set of data and the second set of data to identify one or more objects within the environment. Step 1618 may include, for example, applying the one or more objects to a map of the environment.

With computer hardware shrinking and computing power increasing, a small mobile robot may not be able to physically accommodate an onboard supercomputer along with its associated power requirements and software. Therefore, while the software tools of Artificial Intelligence (AI) are finally becoming much more capable, an autonomous robot may not be able to fully realize machine intelligence while relying solely on its onboard computational hardware and software.

Therefore, a robotic device may have two separate minds: a first mind onboard the robot ("mind one"), and a second mind that exists offboard, for example in the cloud ("mind two"). Its own onboard hardware and software (mind one) is able to accomplish its basic, established functions under ordinary circumstances. However, the robot may not be able to complete more rigorous, time consuming, or data heavy tasks with mind one by itself due to a lack of sufficient resources, such as power, storage, processing, etc. The cloud (mind two) will allow the robot to expand its intelligence seamlessly when confronted with new, unusual, computationally demanding (e.g., facial recognition, modelling and simulation), or unexpected situations (novel threats or opportunities), or to enhance its performance when using mind one. For example, mind two may be offline, and therefore may include unlimited power, storage, processing, etc. This will allow the robot or a user of the robot to divide tasks between its two minds, one of which is mobile (mind one on the robot) and one of which is not. More specifically, one example cloud network that could act as part or all of mind two is IBM's Cloud Computing system, which includes access to Watson and other AI technology platforms that use data mining and machine learning to reveal insights from voluminous unstructured data. A communication link may be established between the robot and the cloud to integrate mind one and mind two with a new intelligent control system architecture to accommodate the dual cetralized and decentralized nature of the robot's mind. As described herein, for example with respect to FIGS. 1 and 2, data collected by the robot and therefore shared between the two minds may consist of sensor information such as pictures, lidar scans, and video streams, along with approprite metadata associated with that data.

Figure 17:
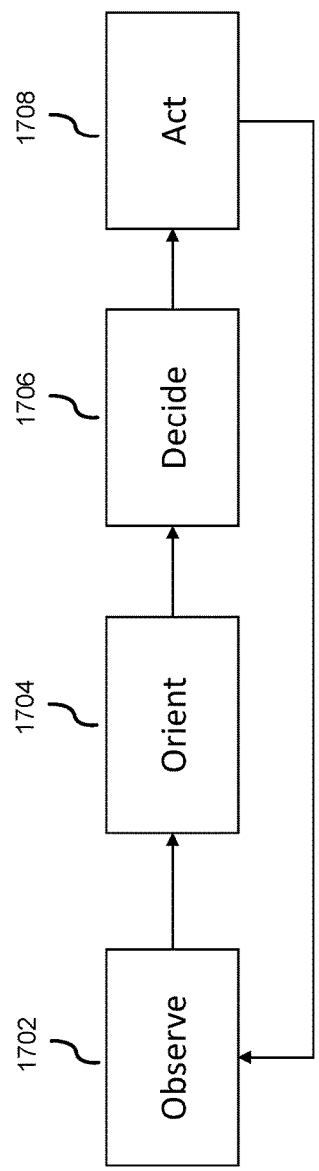
FIG. 17 illustrates a flow chart illustrating a Observe Orient Decide and Act (OODA) process loop applied to a robotic device in an environment, according to embodiments of the present technology.

FIG. 17 illustrates a flow chart illustrating a Observe Orient Decide and Act (OODA) process loop applied to a robotic device in an environment, according to embodiments of the present technology. The process loop includes four main steps. First, observe at box 1702, includes using sensors to collect information about the environment in which the robotic device is located. Second, orient at box 1704, includes putting all of the sensor data into a common frame of reference, either relative to the robot or, alternatively, relative to a map of the environment generated by the robot. Orienting may include, for example, assigning characteristic data or metadata to the collected data so that it is clear what the collected data means. In one example, the physical orientation of a sensor (e.g. LIDAR, 3D video, etc.) may change the meaning of a particular piece of captured data. Third, decide at box 1706, includes determining which data of the collected information is relevant to the robot and deciding what to do about that relevant information (i.e. go around an obstacle). Deciding may include, for example, determining whether a particular event occurred. Furthermore, the avoiding false alarms principles and methods described herein may also apply to this step. Fourth, act at box 1708, includes sending commands to the robot to carry out the decision. This may include, for example, storing the decision and related data in a particular library, or something more active like moving or transmitting an alert or notification. Each of the robot's two minds may include such a process loop, as described further below. For example, as described further below, the robot may distribute work based on which point in the OODA process the work exists, or based on the substance of the work.

Figure 18:
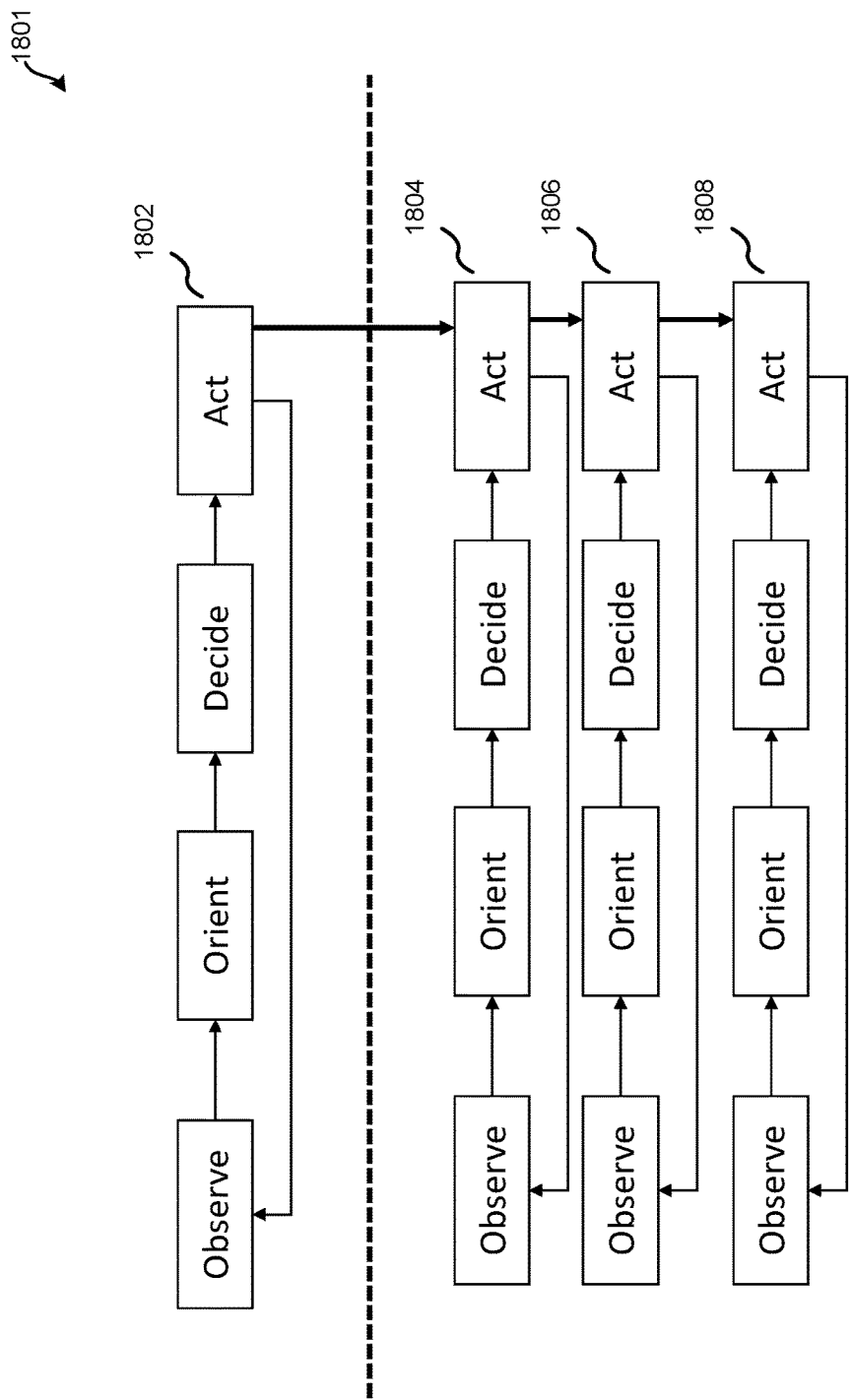
FIG. 18 illustrates a flow chart illustrating a OODA process loops associated with multiple minds of a robotic device in an environment, according to embodiments of the present technology.

FIG. 18 illustrates a flow chart illustrating a OODA process loops associated with multiple minds of a robotic device in an environment, according to embodiments of the present technology. A robot may include three OODA process loops, such as loops 1804, 1806 and 1808. The robot process loops may be in communication with each other as shown in FIG. 18. As shown, each of loops 1804, 1806 and 1808 include observe, orient, decide and act boxes/actions. The loops may work together in a hierarchical structure such that each layer only talks to the one layer above it. Loop 1804 may represent the decision process for the long-range planner, which determines the robot's path to waypoints using a map. This planner may determines the most efficient path for the robot to accomplish tasks. Therefore, the data being gathered in the observe block at loop 1804 may be related to the robot's path using a map, and data may then be oriented to correspond with the directions on the map. Loop 1806 may represent the decision process for the short-range planner that avoids obstacles. This planner may allow the robot to react to nearby objects that may not be on a map. Therefore, the data being gathered in the observe block at loop 1806 may be related to the robot avoiding obstacles, and data may then be oriented to what it sees with its sensors to try to avoid obstacles. Loop 1808 may represent the decision process for the low level controller that manages the robot's systems (e.g. power, relays, lights, etc.). This planner may be responsible for health of the onboard systems. Therefore, the data being gathered in the observe block at loop 1808 may be related to the robot internal controls within the robot. In this situation, lower layers may have a higher priority and pre-empt the higher layers. In other words, each level only sends data to the one level higher than it, and they can only get commands from one level below it.

Furthermore, the robot's mind two, or the external, cloud-based mind, may also include such a loop, which is shown in FIG. 18 as loop 1802. Cloud loop 1802 may only interact with robot loop 1804. Therefore, the cloud may only interact with the robot between loops 1802 and 1804. This loop may include, for example, performing high level processes, such as object and people recognition, solving problems, doing advanced planning, completing complex goals using multiple robots. Therefore, although as described herein the robot has only two minds, the robot may designate work to its two minds while keeping in mind the responsibility and loops being performed in the context of each level of the hierarchy. For example, if a robot needs to complete a processing task that has internal ramifications within the robot, then the robot may perform that work himself using loop 1808. In another example, if the robot needs to avoid an unexpected box in a warehouse, robot, then the robot may perform that work himself using loop 1806. In another example, if the robot needs to drive to an elevator, then the robot may perform that work himself using loop 1804. However, for example, if the robot needs to communicate with another robot, perhaps to transmit data including language in a foreign language, then the robot may assign that work to the cloud in mind two using loop 1802.

For a robot, having two separate processing and other resource minds may help the robot process information substantially. For example, as described with respect to the security and/or monitoring robot described herein, having available resources to perform regular tasks is an important component of the robot being prepared to do its job. For example, if the robot determines, while patroling an environment, that it has collected data via its sensors that indicate that an event has occurred, then the robot may have the option of pausing its patrol to attend to actions associated with the event. However, pausing the patrol to attend to the event may cause the robot to miss or delay a portion of its scheduled patrol, which may allow for other undesirable events to occur in the meantime. In the alternative, the robot may transmit the data it collected, and any determinations it made associated with that data, to the cloud for processing. The data and determinations may also be transmitted with instructions about what actions to take once the data is recived by the cloud, but that is not necessary since the cloud contains a second mind associated with the robot. Therefore, the robot may be allowed to continue its patrol without interruption.

The robot may dynamically decide which portions of its processing it wants to assign to its first mind, and which it wants to assign to its second mind. This decision may be based on a variety of factors, including bandwidth, data size, type of event, among others. For example, the robot may have a predetermined (or dynamically updating) threshold for the amount of data it is to process on mind one. After the robot collects and recognizes a need to process an amount of data higher than the threshold, the robot may automatically transmit a request, along with data, to mind two for processing. In another example, the robot may assign all initial processing to mind one, but assign all processing associated with an event after the event has been detected to mind two. In another example, the robot may rank processes, data or other aspects of its role using a hierarchical ranking system, either dynamically set and adjusted by the robot or set by a user. In another example, the robot may determine what types of jobs to assign to mind two based on the other jobs it currently has in its queue. In another example, the robot may assign projects to its two minds based on which projects are better performed by a mobile mind (e.g. mind one, on the robot) as compared to an immobile mind (e.g. mind two). In another example, the robot may assign projects to its two minds based on the speed with which a projects needs to be performed. Since the data necessary to perform certain processing functions is already located on the robot (since the data was collected by the robot's sensors), the robot may be capable of beginning processing quicker. The decision may also be determined based on context parameters. The robot may have a decision tree associated with the decision of which mind should process which actions/commands. Thresholds and other rules may exist and be associated with different types of factors as described herein and otherwise.

No matter which processes are used, there are certain example situations where the robot may utilize its second mind in the cloud to assist with processing its work. For example, the robot may be configured to hold a conversation with a person it detects. The conversation may be used to determine whether the person is an intruder. The robot may transmit data associated with the conversation to its second mind for processing, interpretation, or other processing. For example, if the person is speaking in a different language, the robot may utilize the cloud to interpret or analyze the language. In another example, the robot may utilize the cloud if it receives or generates data that it does not recognize. For example, the unrecognizable data may be related to the type of data (e.g. audio file) or the data itself. For example, if the robot receives data associated with facial recognition software, the robot may need access to the internet or another external database complete the recognition process. In another situation, the robot may utilize its second mind if it gets lost and needs to connect to another system to retrieve a map or get directions to get it back on its route.

As noted, the false alarm methods and systems described herein may be used in conjunction with the two minds of the robot to determine which ind should process which actions/commands. For example, the robot may take part in two different types of learning, including supervised learning and unsupervised learning. In supervised learning, a user of the robot may oversee the decisions being made by the robot, either associated with how to divide the robot's work and processes, or otherwise. In unsupervised learning, the robot makes its own decisions and gives its own feedback. In either situation, the robot may make decisions with or without assistance from an outside entity, and then re-use or recycle those decisions by determine how the decisions turn out and using that data for future decisions. In one example, the robot may determine that any type of unsupervised learning, where the robot does not get feedback on decisions from a user, may be appropriate to assign to mind two, or the cloud. This assignment may make sense because the cloud may have more resources, such as processing power, bandwidth, storage, etc., and therefore may be able to more dynamically assess the unsupervised learning and the data associated with it.

The decision making process regarding distribution of work between the two minds may also be determined by mind two in the cloud, and not at the mobile robot. For example, the robot may immediately transmit all data it receives, a subset (random or otherwise) of the data it receives, or one or more analyzed determinations about all data it receives, to the cloud. The cloud may then perform an analysis to determine which work should be performed by mind one and mind two. Regarding the work to be performed by mind one as determined by the cloud, the cloud may then transmit data back to the robot for processing. In the alternative, cloud two may be designated as the highest priority mind for performing all functions, or certain functions based on the above-described factors.

Figure 19:
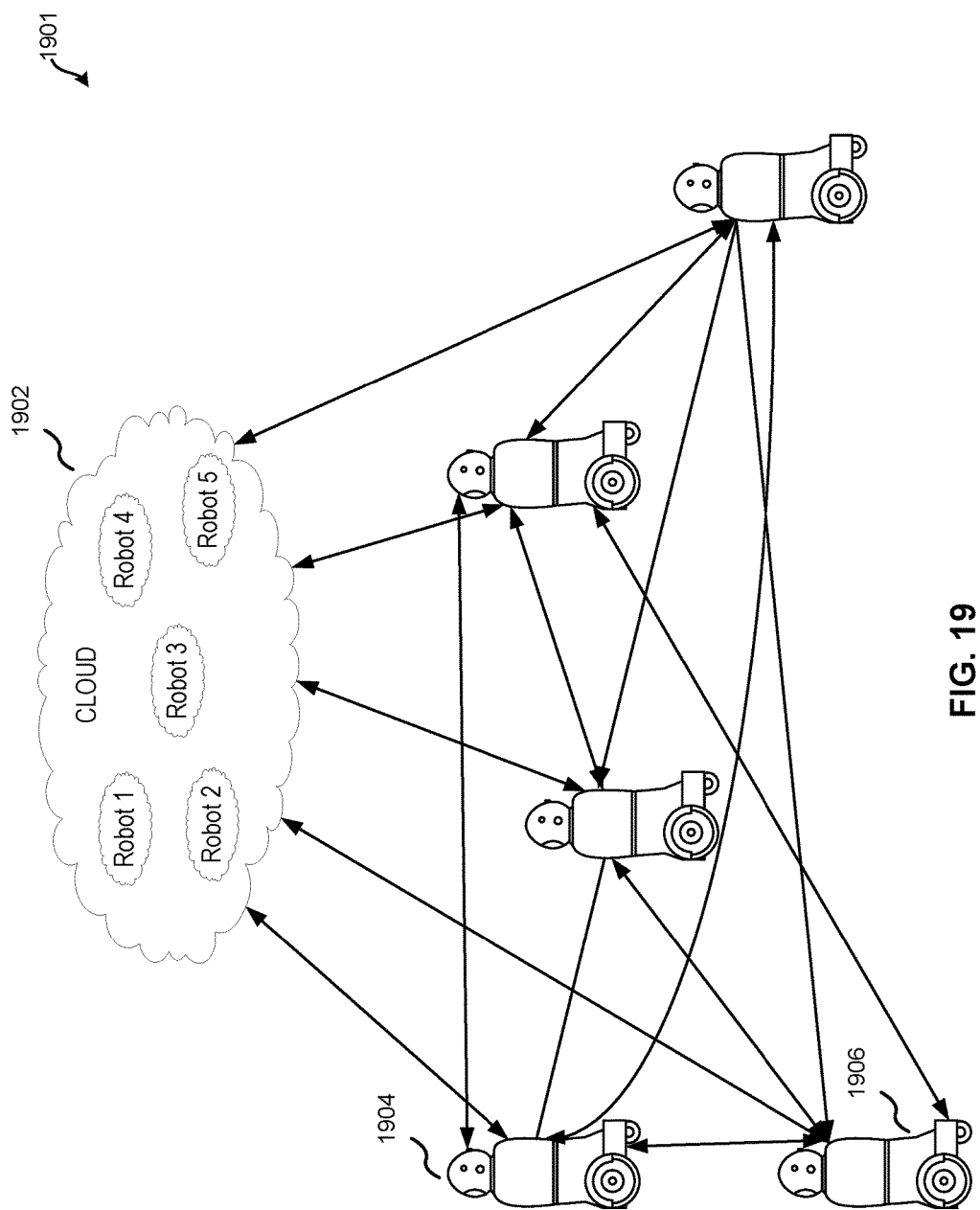
FIG. 19 shows a flow chart illustrating an example distributed computing environment including a cloud network and multiple robots, according to embodiments of the present technology.
Figure 20:
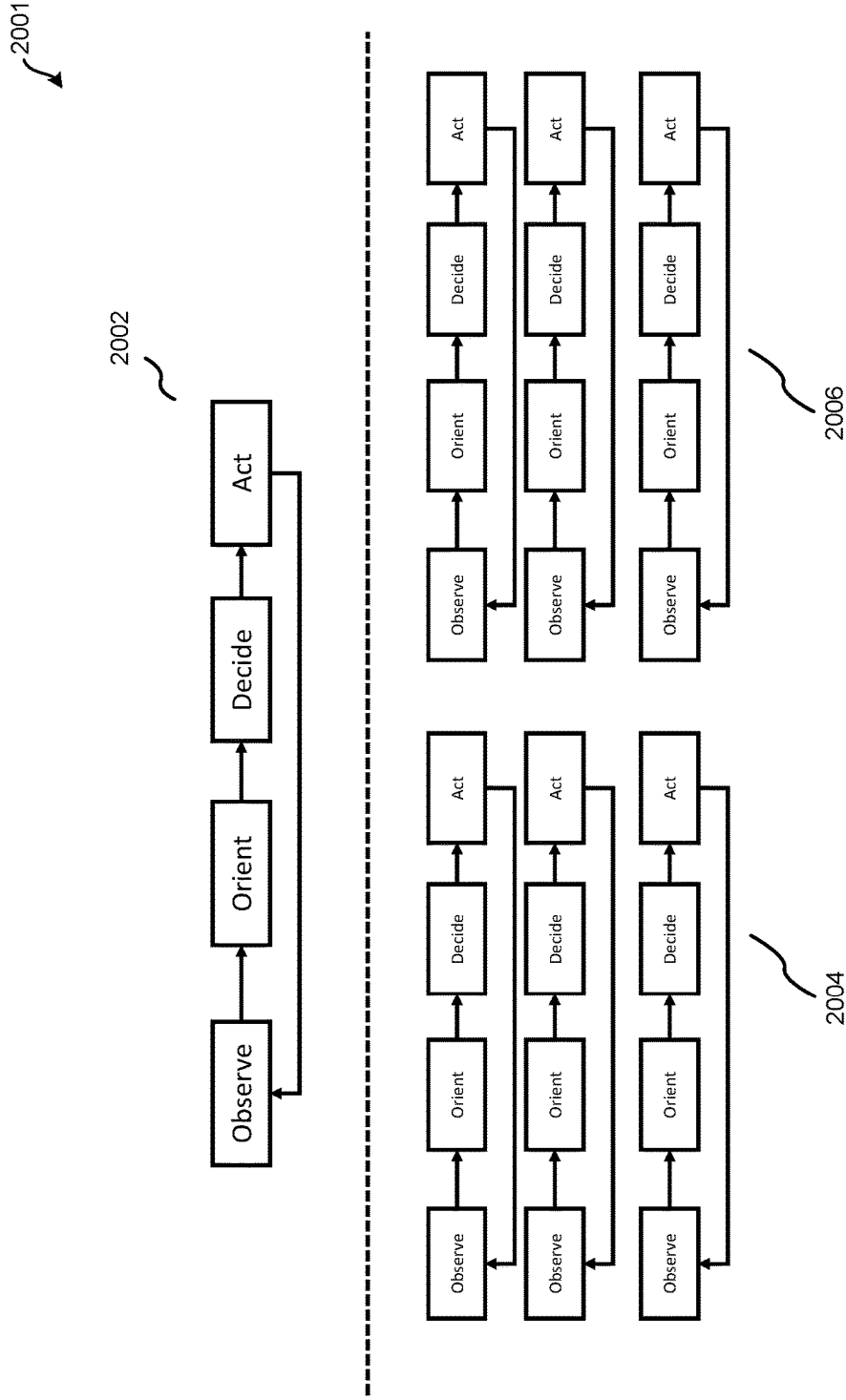
FIG. 20 shows a flow chart illustrating the OODA process loops associated with multiple minds of multiple robotic devices in an environment, according to embodiments of the present technology.

As noted herein, the cloud may be used to control a distributed, parallel computing environment using multiple robots. For example, if a robot wants to complete interactions with different robots, mind two may be best suited to organize such communication and relationships. FIG. 19 shows a flow chart illustrating an example distributed computing environment including a cloud network and multiple robots, according to embodiments of the present technology. In addition, FIG. 20 shows a flow chart illustrating the OODA process loops associated with multiple minds of multiple robotic devices in an environment, according to embodiments of the present technology. In this type of multiple robot environment, the cloud-based, second mind of the robot(s) may solve problems (e.g. detected events) by assigning multiple robots to perform individual roles. For example, if a fire alarm goes off in an environment, two robots could be assigned to check out the alarm, three robots drive around making evacuation announcements, and one robot watches the door and counts people as they leave the environment. In other words, on this higher level, the same architecture can be used to monitor and coordinate multiple robots, with one common (second) "brain" being shared between the robots. In one example, the cloud 1902 may instruct a robot to move to a certain position in the environment. Robots 1904 and 1906, represented by processes 2004 and 2006, on the other hand, perform their lower level functions as assigned by the robot or cloud as described above.

With this structure, the system of robots is able to avoid conflicts associated with the projects to be performed by the group of robots. For example, if a certain type of project is to be performed, it is reasonably clear which mind will complete the project. In fact, each of the minds, and each of the robots within robot portion of the hierarchy, may not even know which portions of the projects or tasks are being performed by others. Therefore, for example, a particular robot may not know why he is moving to a certain place. However, it knows, via its first process and loop 1804, that it needs to avoid obstacles along the way. In other words, each level of the hierarchy does its job and nobody else's job unless the cloud, mind two, says so. Each mind, and each loop within each mind, has different planning horizons, or different decision areas that they encompass.

Figure 21:
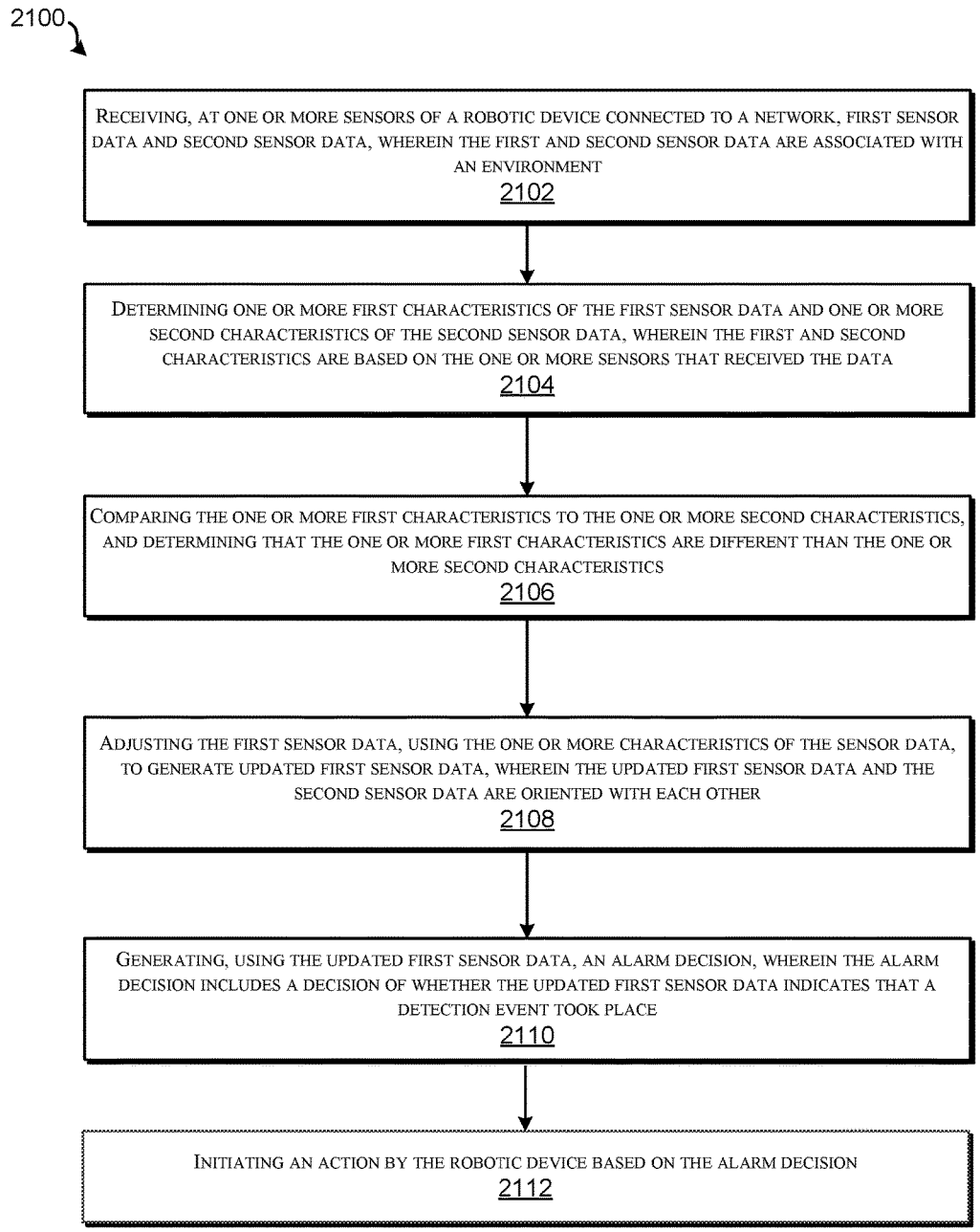
FIG. 21 illustrates a flow chart illustrating an example process of utilizing a robot with two minds, according to embodiments of the present technology.

FIG. 21 illustrates a flow chart illustrating an example process of utilizing a robot with two minds, according to embodiments of the present technology. Step 2102 may include, for example, receiving, at one or more sensors of a robotic device connected to a network, first sensor data and second sensor data, wherein the first and second sensor data are associated with an environment. Step 2104 may include, for example, determining one or more first characteristics of the first sensor data and one or more second characteristics of the second sensor data, wherein the first and second characteristics are based on the one or more sensors that received the data. Step 2106 may include, for example, comparing the one or more first characteristics to the one or more second characteristics, and determining that the one or more first characteristics are different than the one or more second characteristics. Step 2108 may include, for example, adjusting the first sensor data, using the one or more characteristics of the sensor data, to generate updated first sensor data, wherein the updated first sensor data and the second sensor data are oriented with each other. Step 2110 may include, for example, generating, using the updated first sensor data, an alarm decision, wherein the alarm decision may include, for example, a decision of whether the updated first sensor data indicates that a detection event took place. Step 2112 may include, for example, initiating an action by the robotic device based on the alarm decision.

Alternative embodiments of the present technology may include a method. The method may comprise receiving sensor data at one or more sensors of a robot at a first location, wherein the sensor data is associated with an alarm of the robot; determining, based on the sensor data and a set of positive logic patterns in a first pattern library, a first portion of the sensor data that fits one or more positive logic patterns; determining, based on the sensor data and a set of negative logic patterns in a second pattern library, a second portion of the sensor data that fits one or more negative logic patterns; determining, based on the determined first portion of the sensor data, the determined second portion of sensor data, and the received sensor data, a third portion of sensor data that does not fit positive logic patterns or negative logic patterns; generating, using the first, second and third portions of data, an alarm decision, wherein the alarm decision includes a decision of whether or not to activate the alarm of the robot; receiving an input indicating whether the alarm decision was correct; and transmitting the alarm decision and the input to either the first pattern library or the second pattern library based on the input.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving sensor data at one or more sensors of a robot at a first location, wherein the sensor data is associated with an alarm of the robot; determining, based on the sensor data and a set of positive logic patterns in a first pattern library, a first portion of the sensor data that fits one or more positive logic patterns; determining, based on the sensor data and a set of negative logic patterns in a second pattern library, a second portion of the sensor data that fits one or more negative logic patterns; determining, based on the determined first portion of the sensor data, the determined second portion of sensor data, and the received sensor data, a third portion of sensor data that does not fit positive logic patterns or negative logic patterns; generating, using the first, second and third portions of data, an alarm decision, wherein the alarm decision includes a decision of whether or not to activate the alarm of the robot; receiving an input indicating whether the alarm decision was correct; and transmitting the alarm decision and the input to either the first pattern library or the second pattern library based on the input.

Alternative embodiments of the present technology may include a non-transitory computer readable medium comprising instructions that, when executed by one or more processors, cause the one or more processors to perform operations including receiving sensor data at one or more sensors of a robot at a first location, wherein the sensor data is associated with an alarm of the robot; determining, based on the sensor data and a set of positive logic patterns in a first pattern library, a first portion of the sensor data that fits one or more positive logic patterns; determining, based on the sensor data and a set of negative logic patterns in a second pattern library, a second portion of the sensor data that fits one or more negative logic patterns; determining, based on the determined first portion of the sensor data, the determined second portion of sensor data, and the received sensor data, a third portion of sensor data that does not fit positive logic patterns or negative logic patterns; generating, using the first, second and third portions of data, an alarm decision, wherein the alarm decision includes a decision of whether or not to activate the alarm of the robot; receiving an input indicating whether the alarm decision was correct; and transmitting the alarm decision and the input to either the first pattern library or the second pattern library based on the input.

Alternative embodiments of the present technology may include a method. The method may comprise receiving, at an antenna of a robotic device, a first set of data indicating that one or more of a first set of RFID tags are within a predetermined range of the robotic device at a first time; determining a location of the robotic device when the first set of data is received; determining a communication path between the robotic device and the one or more of the first set of RFID tags; receiving a second set of data indicating that one or more of a second set of RFID tags are within the predetermined range of the robotic device at a second time; determining a location of the robotic device when the second set of data is received; determining a communication path between the robotic device and the one or more of the second set of RFID tags; comparing the first set of RFID tags and the second set of RFID tags to determine a set of new RFID tags; and determining a location of each RFID tag in the set of new RFID tags using the first communication path and the second communication path.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at an antenna of a robotic device, a first set of data indicating that one or more of a first set of RFID tags are within a predetermined range of the robotic device at a first time; determining a location of the robotic device when the first set of data is received; determining a communication path between the robotic device and the one or more of the first set of RFID tags; receiving a second set of data indicating that one or more of a second set of RFID tags are within the predetermined range of the robotic device at a second time; determining a location of the robotic device when the second set of data is received; determining a communication path between the robotic device and the one or more of the second set of RFID tags; comparing the first set of RFID tags and the second set of RFID tags to determine a set of new RFID tags; and determining a location of each RFID tag in the set of new RFID tags using the first communication path and the second communication path.

Alternative embodiments of the present technology may include a non-transitory computer readable medium comprising instructions that, when executed by one or more processors, cause the one or more processors to perform operations including receiving, at an antenna of a robotic device, a first set of data indicating that one or more of a first set of RFID tags are within a predetermined range of the robotic device at a first time; determining a location of the robotic device when the first set of data is received; determining a communication path between the robotic device and the one or more of the first set of RFID tags; receiving a second set of data indicating that one or more of a second set of RFID tags are within the predetermined range of the robotic device at a second time; determining a location of the robotic device when the second set of data is received; determining a communication path between the robotic device and the one or more of the second set of RFID tags; comparing the first set of RFID tags and the second set of RFID tags to determine a set of new RFID tags; and determining a location of each RFID tag in the set of new RFID tags using the first communication path and the second communication path.

Alternative embodiments of the present technology may include a method. The method may comprise receiving, at one or more sensors of a robotic device, a first set of data associated with an environment; analyzing the received first set of data to determine if the data indicates that a person is within a predetermined range of the robotic device; identifying that the person is a target of the robotic device in response to determining that the data indicates that the person is within the predetermined range, wherein a target includes an object that the robotic device intends to follow; determining a first location of the person using the received first set of data; determining a second location of the person using a second set of data captured by the one or more sensors; determining, using the first location and the second location, that the person has moved more than a predetermined threshold distance; adjusting at least one of a direction and a speed of the robotic device based on the second location of the person; analyzing the first set of data and the second set of data to identify one or more objects within the environment; and applying the one or more objects to a map of the environment.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device, a first set of data associated with an environment; analyzing the received first set of data to determine if the data indicates that a person is within a predetermined range of the robotic device; identifying that the person is a target of the robotic device in response to determining that the data indicates that the person is within the predetermined range, wherein a target includes an object that the robotic device intends to follow; determining a first location of the person using the received first set of data; determining a second location of the person using a second set of data captured by the one or more sensors; determining, using the first location and the second location, that the person has moved more than a predetermined threshold distance; adjusting at least one of a direction and a speed of the robotic device based on the second location of the person; analyzing the first set of data and the second set of data to identify one or more objects within the environment; and applying the one or more objects to a map of the environment.

Alternative embodiments of the present technology may include a non-transitory computer readable medium comprising instructions that, when executed by one or more processors, cause the one or more processors to perform operations including receiving, at one or more sensors of a robotic device, a first set of data associated with an environment; analyzing the received first set of data to determine if the data indicates that a person is within a predetermined range of the robotic device; identifying that the person is a target of the robotic device in response to determining that the data indicates that the person is within the predetermined range, wherein a target includes an object that the robotic device intends to follow; determining a first location of the person using the received first set of data; determining a second location of the person using a second set of data captured by the one or more sensors; determining, using the first location and the second location, that the person has moved more than a predetermined threshold distance; adjusting at least one of a direction and a speed of the robotic device based on the second location of the person; analyzing the first set of data and the second set of data to identify one or more objects within the environment; and applying the one or more objects to a map of the environment.

Alternative embodiments of the present technology may include a method. The method may comprise receiving, at one or more sensors of a robotic device, sensor data associated with an environment; analyzing the sensor data to determine a set of objects in the environment; analyzing the set of objects to determine a first subset of the objects that are mobile and a second subset of the objects that are immobile, wherein analyzing the set of objects includes using object recognition or classification algorithms; generating a base level of a map including the immobile objects, wherein the map is used by the robot to navigate the environment; generating a mobile level of the map including the mobile objects, wherein the mobile level is overlaid on top of the base level to generate the map; and storing the base level and the mobile level, wherein the base level and mobile level are stored as separate files in the robot.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device, sensor data associated with an environment; analyzing the sensor data to determine a set of objects in the environment; analyzing the set of objects to determine a first subset of the objects that are mobile and a second subset of the objects that are immobile, wherein analyzing the set of objects includes using object recognition or classification algorithms; generating a base level of a map including the immobile objects, wherein the map is used by the robot to navigate the environment; generating a mobile level of the map including the mobile objects, wherein the mobile level is overlaid on top of the base level to generate the map; and storing the base level and the mobile level, wherein the base level and mobile level are stored as separate files in the robot.

Alternative embodiments of the present technology may include a non-transitory computer readable medium comprising instructions that, when executed by one or more processors, cause the one or more processors to perform operations including receiving, at one or more sensors of a robotic device, sensor data associated with an environment; analyzing the sensor data to determine a set of objects in the environment; analyzing the set of objects to determine a first subset of the objects that are mobile and a second subset of the objects that are immobile, wherein analyzing the set of objects includes using object recognition or classification algorithms; generating a base level of a map including the immobile objects, wherein the map is used by the robot to navigate the environment; generating a mobile level of the map including the mobile objects, wherein the mobile level is overlaid on top of the base level to generate the map; and storing the base level and the mobile level, wherein the base level and mobile level are stored as separate files in the robot.

Alternative embodiments of the present technology may include a method. The method may comprise receiving, at one or more sensors of a robotic device, first sensor data at a first time period, wherein the first sensor data is associated with an environment; analyzing the sensor data to determine a set of objects in the environment, wherein the set of objects includes a first subset of the objects that are mobile and a second subset of the objects that are immobile; generating a map of the environment including the set of objects and a grid, wherein the grid includes multiple grid sections, wherein the grid sections each represent a portion of the environment; determining which grid sections of the multiple grid sections include an object of the set of objects, wherein when a grid section includes an object of the set of objects, a status of the grid section is marked as occupied in the map; receiving second sensor data at a second time period, wherein the second sensor data is associated with the environment; detecting movement of an object of the set of objects in the environment, wherein detecting movement of the object includes comparing the first sensor data and the second sensor data; and changing the status of the grid section from occupied to unoccupied based on the movement of the object.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device, first sensor data at a first time period, wherein the first sensor data is associated with an environment; analyzing the sensor data to determine a set of objects in the environment, wherein the set of objects includes a first subset of the objects that are mobile and a second subset of the objects that are immobile; generating a map of the environment including the set of objects and a grid, wherein the grid includes multiple grid sections, wherein the grid sections each represent a portion of the environment; determining which grid sections of the multiple grid sections include an object of the set of objects, wherein when a grid section includes an object of the set of objects, a status of the grid section is marked as occupied in the map; receiving second sensor data at a second time period, wherein the second sensor data is associated with the environment; detecting movement of an object of the set of objects in the environment, wherein detecting movement of the object includes comparing the first sensor data and the second sensor data; and changing the status of the grid section from occupied to unoccupied based on the movement of the object.

Alternative embodiments of the present technology may include a non-transitory computer readable medium comprising instructions that, when executed by one or more processors, cause the one or more processors to perform operations including receiving, at one or more sensors of a robotic device, first sensor data at a first time period, wherein the first sensor data is associated with an environment; analyzing the sensor data to determine a set of objects in the environment, wherein the set of objects includes a first subset of the objects that are mobile and a second subset of the objects that are immobile; generating a map of the environment including the set of objects and a grid, wherein the grid includes multiple grid sections, wherein the grid sections each represent a portion of the environment; determining which grid sections of the multiple grid sections include an object of the set of objects, wherein when a grid section includes an object of the set of objects, a status of the grid section is marked as occupied in the map; receiving second sensor data at a second time period, wherein the second sensor data is associated with the environment; detecting movement of an object of the set of objects in the environment, wherein detecting movement of the object includes comparing the first sensor data and the second sensor data; and changing the status of the grid section from occupied to unoccupied based on the movement of the object.

Alternative embodiments of the present technology may include a method. The method may comprise receiving, at one or more sensors of a robotic device, sensor data associated with an environment; receiving a command to find and use an object in the environment; analyzing the sensor data to determine a belief level and a confidence level associated with whether the object is located in the environment, wherein a belief level includes a probability that the object is in the environment and a confidence level is a confidence in the belief level; comparing the belief level and confidence level to at least one threshold; determining that the belief level or the confidence level is greater than the threshold; generating a hypothesis associated with whether the object is located in the environment based on the belief level, confidence level and the at least one threshold; using the object based on the determination that the belief level or the confidence level is greater than the threshold, wherein using the object includes receiving second sensor data associated with the environment; adjusting the belief and confidence levels based on the second data; determining that the hypothesis was incorrect based on the adjusted belief and confidence levels; and generate an updated hypothesis.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device, sensor data associated with an environment; receiving a command to find and use an object in the environment; analyzing the sensor data to determine a belief level and a confidence level associated with whether the object is located in the environment, wherein a belief level includes a probability that the object is in the environment and a confidence level is a confidence in the belief level; comparing the belief level and confidence level to at least one threshold; determining that the belief level or the confidence level is greater than the threshold; generating a hypothesis associated with whether the object is located in the environment based on the belief level, confidence level and the at least one threshold; using the object based on the determination that the belief level or the confidence level is greater than the threshold, wherein using the object includes receiving second sensor data associated with the environment; adjusting the belief and confidence levels based on the second data; determining that the hypothesis was incorrect based on the adjusted belief and confidence levels; and generate an updated hypothesis.

Alternative embodiments of the present technology may include a non-transitory computer readable medium comprising instructions that, when executed by one or more processors, cause the one or more processors to perform operations including receiving, at one or more sensors of a robotic device, sensor data associated with an environment; receiving a command to find and use an object in the environment; analyzing the sensor data to determine a belief level and a confidence level associated with whether the object is located in the environment, wherein a belief level includes a probability that the object is in the environment and a confidence level is a confidence in the belief level; comparing the belief level and confidence level to at least one threshold; determining that the belief level or the confidence level is greater than the threshold; generating a hypothesis associated with whether the object is located in the environment based on the belief level, confidence level and the at least one threshold; using the object based on the determination that the belief level or the confidence level is greater than the threshold, wherein using the object includes receiving second sensor data associated with the environment; adjusting the belief and confidence levels based on the second data; determining that the hypothesis was incorrect based on the adjusted belief and confidence levels; and generate an updated hypothesis.

Alternative embodiments of the present technology may include a method. The method may comprise receiving, at one or more sensors of a drone device, sensor data associated with an environment; receiving a command to find a docking target connected to a robot device in the environment; analyzing the sensor data to determine whether the docking target is located in the environment; generating a hypothesis that the docking target is located in the environment; determining a basket area in the environment, wherein a location and dimensions of the basket area are determined using the robot and the drone, and wherein the location of the basket area is determined so that if the drone positions itself inside the basket area, the drone may safely land on the robot; moving, by the drone, to a position inside the basket area; and using, by the drone, the docking target to dock with the robot.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a drone device, sensor data associated with an environment; receiving a command to find a docking target connected to a robot device in the environment; analyzing the sensor data to determine whether the docking target is located in the environment; generating a hypothesis that the docking target is located in the environment; determining a basket area in the environment, wherein a location and dimensions of the basket area are determined using the robot and the drone, and wherein the location of the basket area is determined so that if the drone positions itself inside the basket area, the drone may safely land on the robot; moving, by the drone, to a position inside the basket area; and using, by the drone, the docking target to dock with the robot.

Alternative embodiments of the present technology may include a non-transitory computer readable medium comprising instructions that, when executed by one or more processors, cause the one or more processors to perform operations including receiving, at one or more sensors of a drone device, sensor data associated with an environment; receiving a command to find a docking target connected to a robot device in the environment; analyzing the sensor data to determine whether the docking target is located in the environment; generating a hypothesis that the docking target is located in the environment; determining a basket area in the environment, wherein a location and dimensions of the basket area are determined using the robot and the drone, and wherein the location of the basket area is determined so that if the drone positions itself inside the basket area, the drone may safely land on the robot; moving, by the drone, to a position inside the basket area; and using, by the drone, the docking target to dock with the robot.

Alternative embodiments of the present technology may include a robot and drone system in an environment for a drone to land on a robot, the system comprising: a robot, wherein the robot includes: a landing frame; and a docking target. The system may also include a drone, wherein the drone includes: a landing pole hook; an inertial measurement unit (IMU); and a camera configured to detect the docking target, wherein the drone is configured to move towards the robot using the detected docking target to guide the drone towards a basket area in the environment; and wherein the landing pole hook is configured to dock to the landing frame so as to allow the drone to land on the robot.

Alternative embodiments of the present technology may include a method. The method may include receiving, at one or more sensors of a robotic device, sensor data associated with a ceiling in an environment from a first perspective of the robot; analyzing the picture and sensor data to determine a set of features of the ceiling; generating and storing a base map using the sensor data and including the set of features of the ceiling, wherein the base map is used by the robot to navigate the environment; receiving, at one or more sensors of the robotic device, additional sensor data associated with the ceiling, wherein the additional data is captured from a second perspective of the robot; comparing the base map with the additional sensor data to determine movement data associated with the robot; and determining a location of the robot based on the movement data.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device, sensor data associated with a ceiling in an environment from a first perspective of the robot; analyzing the picture and sensor data to determine a set of features of the ceiling; generating and storing a base map using the sensor data and including the set of features of the ceiling, wherein the base map is used by the robot to navigate the environment; receiving, at one or more sensors of the robotic device, additional sensor data associated with the ceiling, wherein the additional data is captured from a second perspective of the robot; comparing the base map with the additional sensor data to determine movement data associated with the robot; and determining a location of the robot based on the movement data.

Alternative embodiments of the present technology may include a non-transitory computer readable medium comprising instructions that, when executed by one or more processors, cause the one or more processors to perform operations including receiving, at one or more sensors of a robotic device, sensor data associated with a ceiling in an environment from a first perspective of the robot; analyzing the picture and sensor data to determine a set of features of the ceiling; generating and storing a base map using the sensor data and including the set of features of the ceiling, wherein the base map is used by the robot to navigate the environment; receiving, at one or more sensors of the robotic device, additional sensor data associated with the ceiling, wherein the additional data is captured from a second perspective of the robot; comparing the base map with the additional sensor data to determine movement data associated with the robot; and determining a location of the robot based on the movement data.

Alternative embodiments of the present technology may include a method. The method may comprise analyzing, by a robotic device, device status information, wherein the device status information includes an indication of a first failure, wherein the first failure indicates that a portion of the robotic device has failed; identifying one or more first symptoms of the first failure based on the portion of the robotic device that has failed and based on the device status information; identifying one or more remedies from a list of stored remedies, wherein the list of stored remedies includes possible remedies to rectify failures in the robotic device; executing the one or more remedies to attempt to rectify the first failure; determining an effectiveness weight and a cost weight associated with the one or more executed remedies and the first symptoms of the first failure; receiving new device status information, wherein the new device status information includes an indication of a second failure of a portion of the robotic device; identifying one or more second symptoms associated with the second failure, wherein at least one of the second symptoms overlaps with at least one of the first symptoms; and determining that the one or more remedies should be executed to attempt to rectify the second failure based on the effectiveness weight and the cost weight.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including analyzing, by a robotic device, device status information, wherein the device status information includes an indication of a first failure, wherein the first failure indicates that a portion of the robotic device has failed; identifying one or more first symptoms of the first failure based on the portion of the robotic device that has failed and based on the device status information; identifying one or more remedies from a list of stored remedies, wherein the list of stored remedies includes possible remedies to rectify failures in the robotic device; executing the one or more remedies to attempt to rectify the first failure; determining an effectiveness weight and a cost weight associated with the one or more executed remedies and the first symptoms of the first failure; receiving new device status information, wherein the new device status information includes an indication of a second failure of a portion of the robotic device; identifying one or more second symptoms associated with the second failure, wherein at least one of the second symptoms overlaps with at least one of the first symptoms; and determining that the one or more remedies should be executed to attempt to rectify the second failure based on the effectiveness weight and the cost weight.

Alternative embodiments of the present technology may include a non-transitory computer readable medium comprising instructions that, when executed by one or more processors, cause the one or more processors to perform operations including analyzing, by a robotic device, device status information, wherein the device status information includes an indication of a first failure, wherein the first failure indicates that a portion of the robotic device has failed; identifying one or more first symptoms of the first failure based on the portion of the robotic device that has failed and based on the device status information; identifying one or more remedies from a list of stored remedies, wherein the list of stored remedies includes possible remedies to rectify failures in the robotic device; executing the one or more remedies to attempt to rectify the first failure; determining an effectiveness weight and a cost weight associated with the one or more executed remedies and the first symptoms of the first failure; receiving new device status information, wherein the new device status information includes an indication of a second failure of a portion of the robotic device; identifying one or more second symptoms associated with the second failure, wherein at least one of the second symptoms overlaps with at least one of the first symptoms; and determining that the one or more remedies should be executed to attempt to rectify the second failure based on the effectiveness weight and the cost weight.

Alternative embodiments of the present technology may include a method. The method may comprise receiving, at one or more sensors of a robotic device including a fire extinguishing device, sensor data associated with an environment; generating and storing a map of the environment using the sensor data, wherein the map is used by the robotic device to navigate around the environment; determining a location of the robotic device on the map, wherein the map is updated to indicate a location of the robotic device on the map; determining that a fire is present in the environment based on a portion of the sensor data associated with the environment, wherein the portion of the sensor data includes data associated with smoke or temperature; determining a location of the fire relative to the location of the robotic device; moving, by the robotic device, through the environment to a predetermined position relative to the fire, wherein the robotic device moves through the environment to a predetermined position includes using the map of the environment and the location of the robotic device; and transmitting a request for use of a fire extinguishing device to extinguish the fire.

Alternative embodiments of the present technology may include a system including one or more processors and a non-transitory computer readable storage medium communicatively coupled to the one or more processors. The non-transitory computer readable storage medium may include instructions that, when executed by the one or more processors, cause the one or more processors to perform operations including receiving, at one or more sensors of a robotic device including a fire extinguishing device, sensor data associated with an environment; generating and storing a map of the environment using the sensor data, wherein the map is used by the robotic device to navigate around the environment; determining a location of the robotic device on the map, wherein the map is updated to indicate a location of the robotic device on the map; determining that a fire is present in the environment based on a portion of the sensor data associated with the environment, wherein the portion of the sensor data includes data associated with smoke or temperature; determining a location of the fire relative to the location of the robotic device; moving, by the robotic device, through the environment to a predetermined position relative to the fire, wherein the robotic device moves through the environment to a predetermined position includes using the map of the environment and the location of the robotic device; and transmitting a request for use of a fire extinguishing device to extinguish the fire.

Alternative embodiments of the present technology may include a non-transitory computer readable medium comprising instructions that, when executed by one or more processors, cause the one or more processors to perform operations including receiving, at one or more sensors of a robotic device including a fire extinguishing device, sensor data associated with an environment; generating and storing a map of the environment using the sensor data, wherein the map is used by the robotic device to navigate around the environment; determining a location of the robotic device on the map, wherein the map is updated to indicate a location of the robotic device on the map; determining that a fire is present in the environment based on a portion of the sensor data associated with the environment, wherein the portion of the sensor data includes data associated with smoke or temperature; determining a location of the fire relative to the location of the robotic device; moving, by the robotic device, through the environment to a predetermined position relative to the fire, wherein the robotic device moves through the environment to a predetermined position includes using the map of the environment and the location of the robotic device; and transmitting a request for use of a fire extinguishing device to extinguish the fire.

Alternative embodiments of the present technology may include a robotic device system. The system may include a robotic device in an environment and configured to patrol the environment, wherein the robot includes: one or more sensors configured to collect sensor data associated with the environment; a forward-looking infrared (FLIR) sensor; a smoke detector; and a camera. The system may also include a fire extinguishing unit, wherein the unit includes: a tank configured to hold fire extinguishing liquid or foam; a valve configured to control the release of the fire extinguishing liquid or foam from the tank; a nozzle configured to control the direction of the release of the fire extinguishing liquid or foam; and a servo motor configured to control the nozzle. The robot may be configured to analyze the sensor data to determine if a fire is present in the environment, and/or to transmit control signals to the fire extinguishing unit to extinguish the fire.

Furthermore, the robot or internal computer system may transmit a message or other correspondence (e.g. an alert) to notify a user, set of users, other computer system, etc. that the system has generated or provided an alert or other information. For example, the system may use a server (e.g. transmission server) with a microprocessor and a memory to store preferences of the user(s) to transmit the alert or other notification, transmit the alert from the server over a data channel to a wireless device, and provide a viewer application that causes the notification to display on one or more user computers. The system may also enable a connection from the user computer to the storage that includes the data sets over the internet when a user attempts to connect to the system.

In some examples described herein, the systems and methods may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to or from a device.

Some aspects may utilize the Internet of Things (IoT), where things (e.g., machines, devices, phones, sensors) can be connected to networks and the data from these things can be collected and processed within the things and/or external to the things. For example, with the IoT there can be sensors in many different devices, and analytics can be applied to identify relationships and contribute to increased efficiencies. This can apply to both Big Data analytics and real-time (e.g., event stream processing) analytics. Some aspects may involve fog computing and/or cloud computing.

Alerts or notifications may be generated that may be transmitted to and/or displayed by a remote system. For example, a individual alerts or summary reports may be generated, and this report may be transmitted to a remote system. For example, the remote system may generate a notification of the report in order to alert a user that a determination or generating process is completed. This may advantageously allow a user to remotely initialize a determination or generation processes and then be alerted, such as via a notification wirelessly received on a mobile device, when the processing is complete and a report may be available. In another example, a report and/or results may be transmitted over a network connection to a mobile or remote device. Predetermined or real time user preferences may be identified to determine which information to include in a report or which results to be provided to a user. Such preferences may facilitate reducing the total information provided to a user, such as via a mobile device.

The systems, methods, and products described herein are useful for data analysis. In one aspect, this disclosure provide tools for analyzing large sets of data, such as large sets of digital data. Aspects of the current disclosure provide technical solutions to the technical problem of how to efficiently determine (e.g. collect), sort, process, evaluate and make use of large quantities of digital or electronic data. As such, the problem addressed by this disclosure specifically arises in the realm of computers and networks and this disclosure provides solutions necessarily rooted in computer technology. For example, in embodiments, this disclosure is directed to more than just retrieving and storing the data sets and include aspects that transform the data from one form into a new form.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for reducing false alarms in a robotic device using sensor fusion, the method comprising:
   receiving sensor data at one or more sensors of a robot at a first location of an environment, wherein the sensor data indicates a detection event associated with an object in the environment;
   determining, based on the sensor data and a set of positive logic patterns in a first pattern library, a first portion of the sensor data that matches one or more positive logic patterns of the set of positive logic patterns;
   determining, based on the sensor data and a set of negative logic patterns in a second pattern library, a second portion of the sensor data that matches one or more negative logic patterns of the set of negative logic patterns;
   determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns;
   generating, using the first, second and third portions of data, an alarm decision, wherein the alarm decision includes a decision of whether the sensor data indicates that the detection event took place;
   receiving an input indicating that the alarm decision was incorrect;
   linking the alarm decision and the input to each other; and
   transmitting the linked alarm decision and input to the second pattern library based on the input, wherein when the linked alarm decision and input are received, the set of negative logic patterns is updated to include the linked alarm decision and input.

2. The method of claim 1, further comprising:
   linking the alarm decision and the input to the sensor data; and
   transmitting the linked sensor data, alarm decision, and input to the second pattern library based on the input, wherein when the linked sensor data, alarm decision, and input are received, the set of negative logic patterns is updated to include the linked sensor data, alarm decision, and input.

3. The method of claim 1, wherein the updated set of negative logic patterns is used to make future alarm decisions.

4. The method of claim 1, wherein the alarm decision facilitates initiating an alarm being activated to notify a user of the alarm decision.

5. The method of claim 1, wherein the set of positive logic patterns and the set of negative logic patterns are determined using and associated with the detection event.

6. The method of claim 5, wherein the set of positive logic patterns and the set of negative logic patterns are mutually exclusive from each other.

7. The method of claim 1, wherein the received input indicates that the alarm decision was incorrect is a false positive.

8. A robotic device, comprising:
one or more processors;
a memory having instructions stored thereon, which when executed by the one or more processors, cause the computing device to perform operations including:
receiving sensor data at one or more sensors of a robot at a first location of an environment, wherein the sensor data indicates a detection event associated with an object in the environment;
determining, based on the sensor data and a set of positive logic patterns in a first pattern library, a first portion of the sensor data that matches one or more positive logic patterns of the set of positive logic patterns;
determining, based on the sensor data and a set of negative logic patterns in a second pattern library, a second portion of the sensor data that matches one or more negative logic patterns of the set of negative logic patterns;
determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns;
generating, using the first, second and third portions of data, an alarm decision, wherein the alarm decision includes a decision of whether the sensor data indicates that the detection event took place;
receiving an input indicating that the alarm decision was incorrect;
linking the alarm decision and the input to each other; and
transmitting the linked alarm decision and input to the second pattern library based on the input, wherein when the linked alarm decision and input are received, the set of negative logic patterns is updated to include the linked alarm decision and input.

9. The robotic device of claim 8, wherein the operations further include:
linking the alarm decision and the input to the sensor data; and
transmitting the linked sensor data, alarm decision, and input to the second pattern library based on the input, wherein when the linked sensor data, alarm decision, and input are received, the set of negative logic patterns is updated to include the linked sensor data, alarm decision, and input.

10. The robotic device of claim 8, wherein the updated set of negative logic patterns is used to make future alarm decisions.

11. The robotic device of claim 8, wherein the alarm decision facilitates initiating an alarm being activated to notify a user of the alarm decision.

12. The robotic device of claim 8, wherein the set of positive logic patterns and the set of negative logic patterns are determined using and associated with the detection event.

13. The robotic device of claim 12, wherein the set of positive logic patterns and the set of negative logic patterns are mutually exclusive from each other.

14. The robotic device of claim 8, wherein the received input indicates that the alarm decision was incorrect is a false positive.

15. A non-transitory computer readable storage medium communicatively coupled to one or more processors, wherein the non-transitory computer readable storage medium includes instructions that, when executed by the one or more processors, cause the one or more processors to perform operations including:
receiving sensor data at one or more sensors of a robot at a first location of an environment, wherein the sensor data indicates a detection event associated with an object in the environment;
determining, based on the sensor data and a set of positive logic patterns in a first pattern library, a first portion of the sensor data that matches one or more positive logic patterns of the set of positive logic patterns;
determining, based on the sensor data and a set of negative logic patterns in a second pattern library, a second portion of the sensor data that matches one or more negative logic patterns of the set of negative logic patterns;
determining, based on the determined first portion of the sensor data, the set of positive logic patterns, and the set of negative logic patterns, a third portion of sensor data that does not match any positive logic patterns of the set of positive logic patterns or negative logic patterns of the set of negative logic patterns;
generating, using the first, second and third portions of data, an alarm decision, wherein the alarm decision includes a decision of whether the sensor data indicates that the detection event took place;
receiving an input indicating that the alarm decision was incorrect;
linking the alarm decision and the input to each other; and
transmitting the linked alarm decision and input to the second pattern library based on the input, wherein when the linked alarm decision and input are received, the set of negative logic patterns is updated to include the linked alarm decision and input.

16. The robotic device of claim 15, wherein the operations further include:
linking the alarm decision and the input to the sensor data; and
transmitting the linked sensor data, alarm decision, and input to the second pattern library based on the input, wherein when the linked sensor data, alarm decision, and input are received, the set of negative logic patterns is updated to include the linked sensor data, alarm decision, and input.

17. The robotic device of claim 15, wherein the updated set of negative logic patterns is used to make future alarm decisions.

18. The robotic device of claim 15, wherein the alarm decision facilitates initiating an alarm being activated to notify a user of the alarm decision.

19. The robotic device of claim 15, wherein the set of positive logic patterns and the set of negative logic patterns are determined using and associated with the detection event, and wherein the set of positive logic patterns and the set of negative logic patterns are mutually exclusive from each other.

20. The robotic device of claim 15, wherein the received input indicates that the alarm decision was incorrect is a false positive.

* * * * *